(12) United States Patent  (10) Patent No.: US 7,773,073 B2
Nagata et al.  (45) Date of Patent: Aug. 10, 2010

(54) OPERATION EQUIPMENT AND OPERATION SYSTEM

(75) Inventors: Takuya Nagata, Yaita (JP); Hidenori Minoda, Yaita (JP); Yoshihiko Hori, Higashihiroshima (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 982 days.

(21) Appl. No.: 11/480,451

(22) Filed: Jul. 5, 2006

(65) Prior Publication Data

US 2007/0013659 A1  Jan. 18, 2007

(30) Foreign Application Priority Data

Jul. 5, 2005 (JP) ............ 2005-195732
Jul. 5, 2005 (JP) ............ 2005-196232
Jul. 6, 2005 (JP) ............ 2005-196930
Jul. 7, 2005 (JP) ............ 2005-199248
Jul. 19, 2005 (JP) ............ 2005-208128
Jul. 19, 2005 (JP) ............ 2005-208414

(51) Int. Cl.
*G09G 5/00* (2006.01)
*G06F 3/02* (2006.01)

(52) U.S. Cl. .............. 345/169; 345/156; 345/158

(58) Field of Classification Search .......... 345/156–184
See application file for complete search history.

(56) References Cited

U.S. PATENT DOCUMENTS 5,734,371 A * 3/1998 Kaplan .......... 345/158
6,121,529 A * 9/2000 Nakata et al. .......... 84/477 R
6,201,554 B1 * 3/2001 Lands .......... 345/169
6,489,950 B1 * 12/2002 Griffin et al. .......... 345/168
6,731,227 B2 * 5/2004 Horie .......... 345/169
6,765,553 B1 * 7/2004 Odamura .......... 345/156
2005/0208978 A1 * 9/2005 Pylkko .......... 455/566

FOREIGN PATENT DOCUMENTS

JP  2-156319 A  6/1990
JP  02-188819  7/1990

(Continued)

*Primary Examiner*—David L Lewis
(74) *Attorney, Agent, or Firm*—Birch, Stewart, Kolasch & Birch, LLP

(57) ABSTRACT

The subject of the present invention is for offering an operation equipment and an operation system that can select directly either of a plurality of indication keys arranged on an operation screen according to posture of an equipment. An inclination of operation equipment 1 is detected, and the posture signal is made to output by inclination angle detection part 6; the rotation angle of the X-axis and the Y-axis which perpendicularly intersect in parallel, mutually, with the main surface part based on the posture signal by coordinates conversion part 8 is made to compute as an X-axis rotation angle and a Y-axis rotation angle, respectively; while memorizing a cell information, which is made of the plurality of cells, in cell information memory part 11, a conversion table which corresponds each cell of cell information with the indication key is memorized in conversion table memory part 12; while specifying one cell in cell information as a current cell based on the X-axis rotation angle and the Y-axis rotation angle by cursor control part 15, the indication key, which is corresponded to the current cell, is specified by using the conversion table, and a cursor is made to be moved.

3 Claims, 25 Drawing Sheets

FOREIGN PATENT DOCUMENTS

| | | |
|---|---|---|
| JP | 2-190896 A | 7/1990 |
| JP | 5-80925 A | 4/1993 |
| JP | 6-4208 A | 1/1994 |
| JP | 7-134641 A | 5/1995 |
| JP | 7-160427 A | 6/1995 |
| JP | 7-284166 A | 10/1995 |
| JP | 7-302158 A | 11/1995 |
| JP | 9-81320 A | 3/1997 |
| JP | 10-49290 A | 2/1998 |
| JP | 10-200618 A | 7/1998 |
| JP | 10-240434 A | 9/1998 |
| JP | 10-326280 A | 12/1998 |
| JP | 10-333821 A | 12/1998 |
| JP | 2000-47813 A | 2/2000 |
| JP | 2000-56897 A | 2/2000 |
| JP | 2000-148351 A | 5/2000 |
| JP | 2000-194693 A | 7/2000 |
| JP | 2001-136259 A | 5/2001 |
| JP | 2001-159951 A | 6/2001 |
| JP | 2002-62983 A | 2/2002 |
| JP | 2002-149616 A | 5/2002 |
| JP | 2002-251247 | 6/2002 |
| JP | 2002-278671 A | 9/2002 |
| JP | 2003-162371 | 6/2003 |
| JP | 2003-316511 A | 11/2003 |
| JP | 2004-86511 A | 3/2004 |
| JP | 2004-145388 A | 5/2004 |
| JP | 2004-246875 A | 9/2004 |
| JP | 2004-348616 A | 12/2004 |
| WO | WO-01/78054 A1 | 10/2001 |

\* cited by examiner

[FIG. 1]
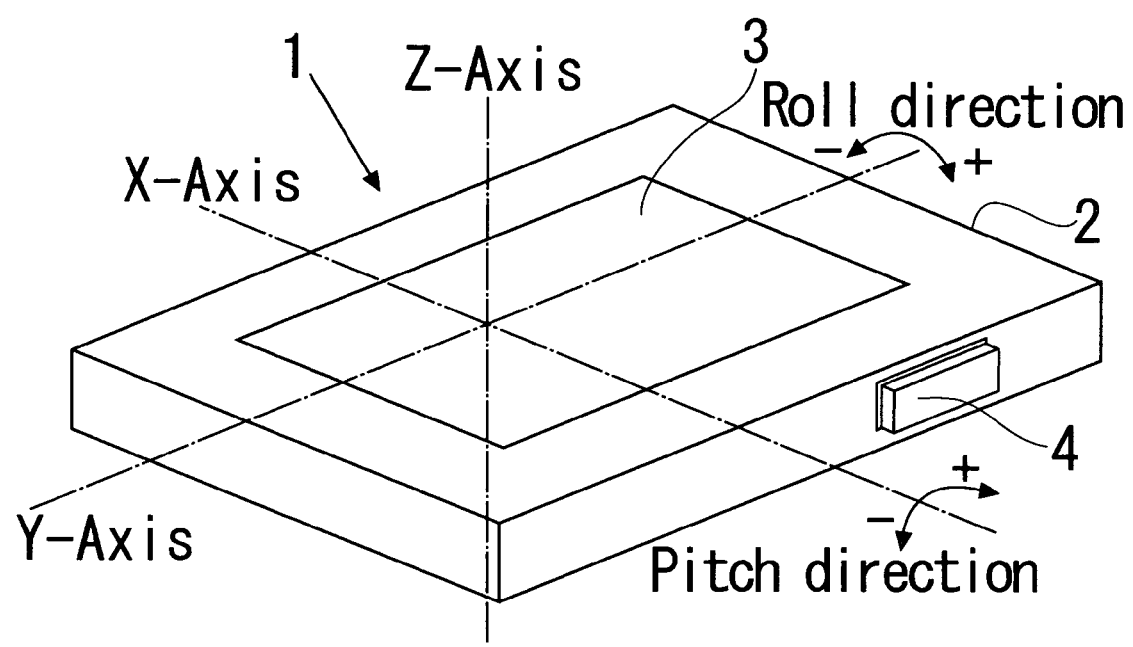

[FIG. 2]
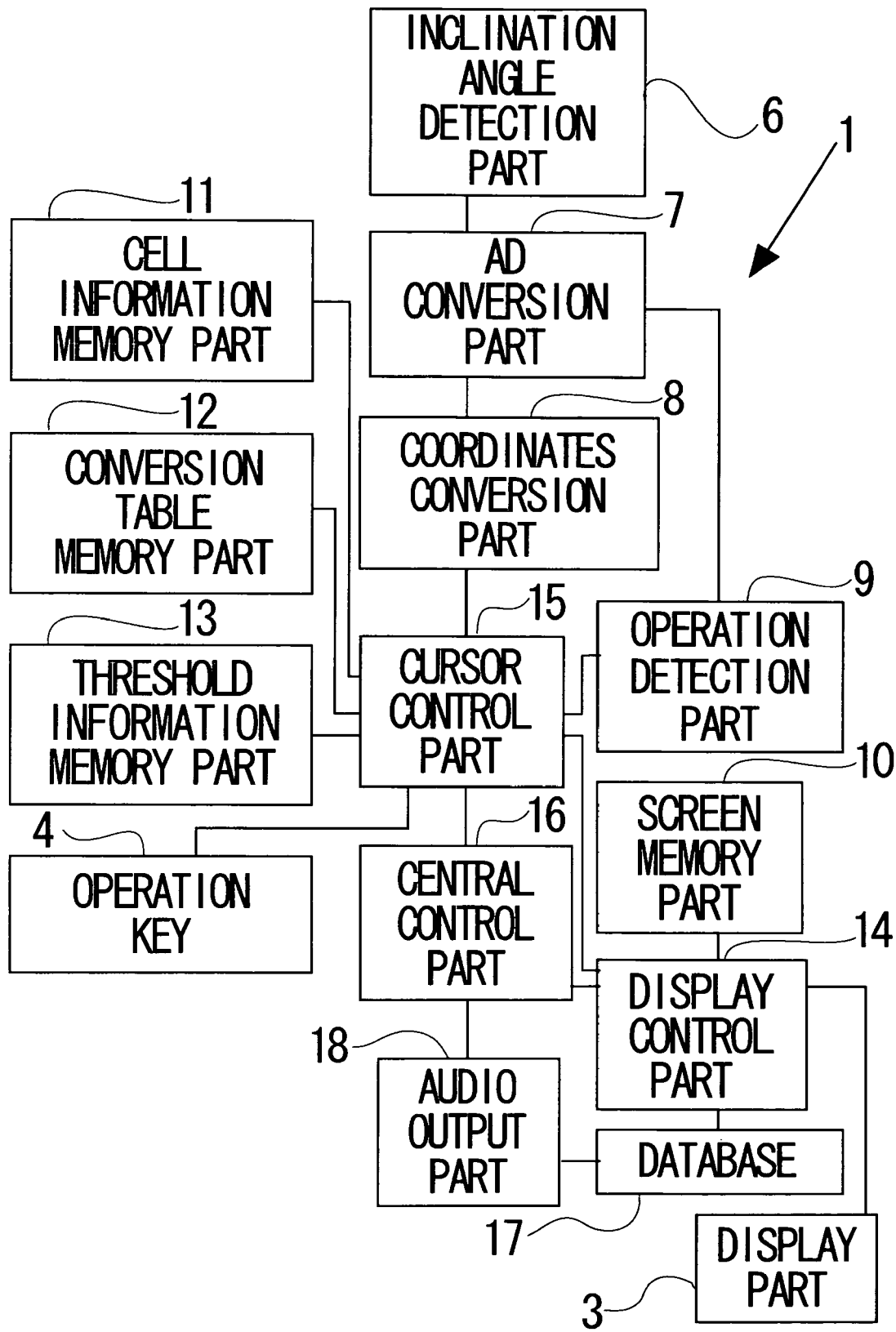

[FIG. 3]
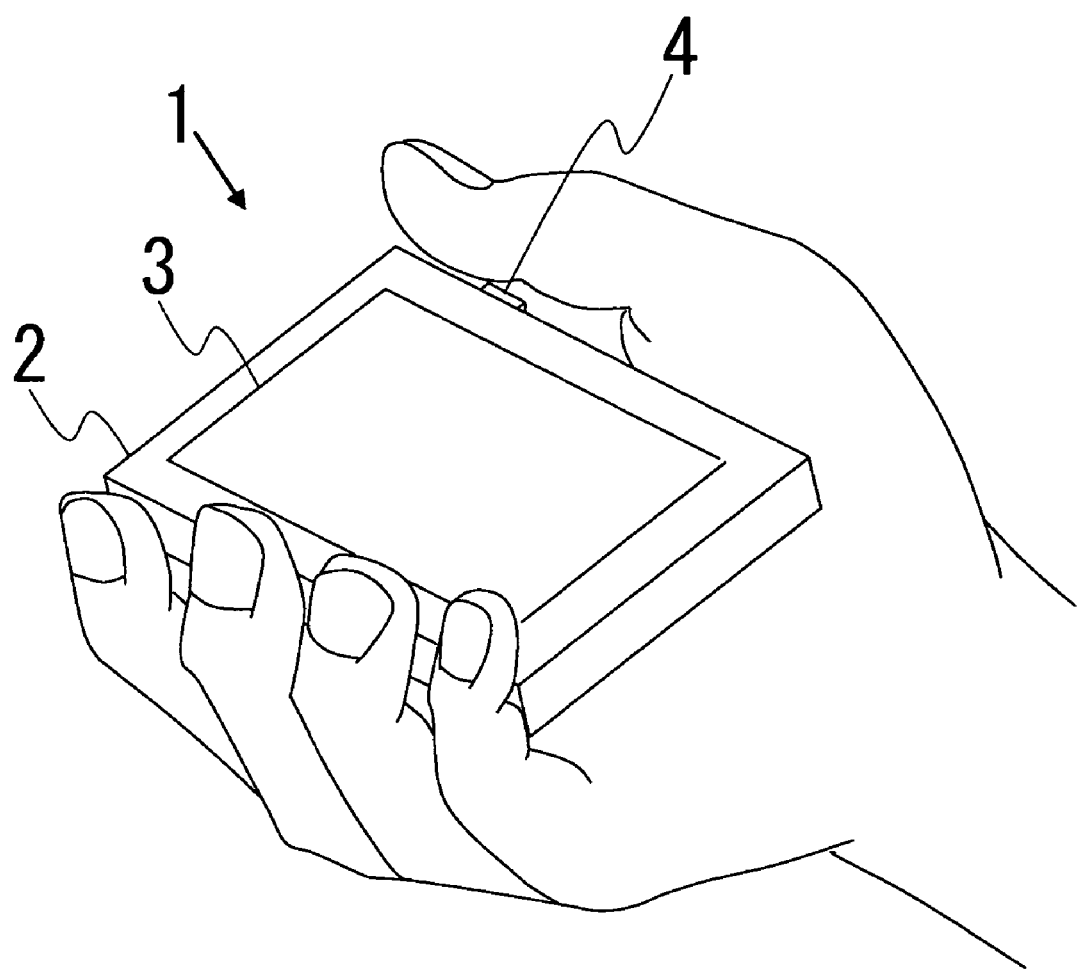

[FIG. 4]
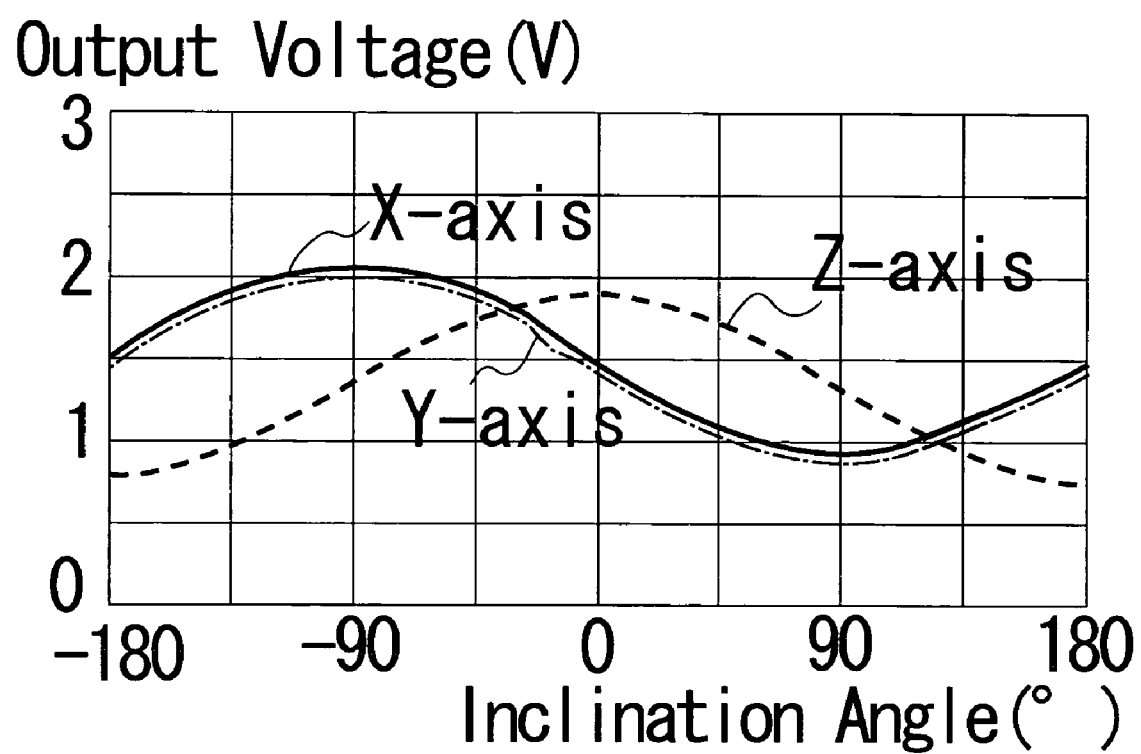

[FIG. 5]
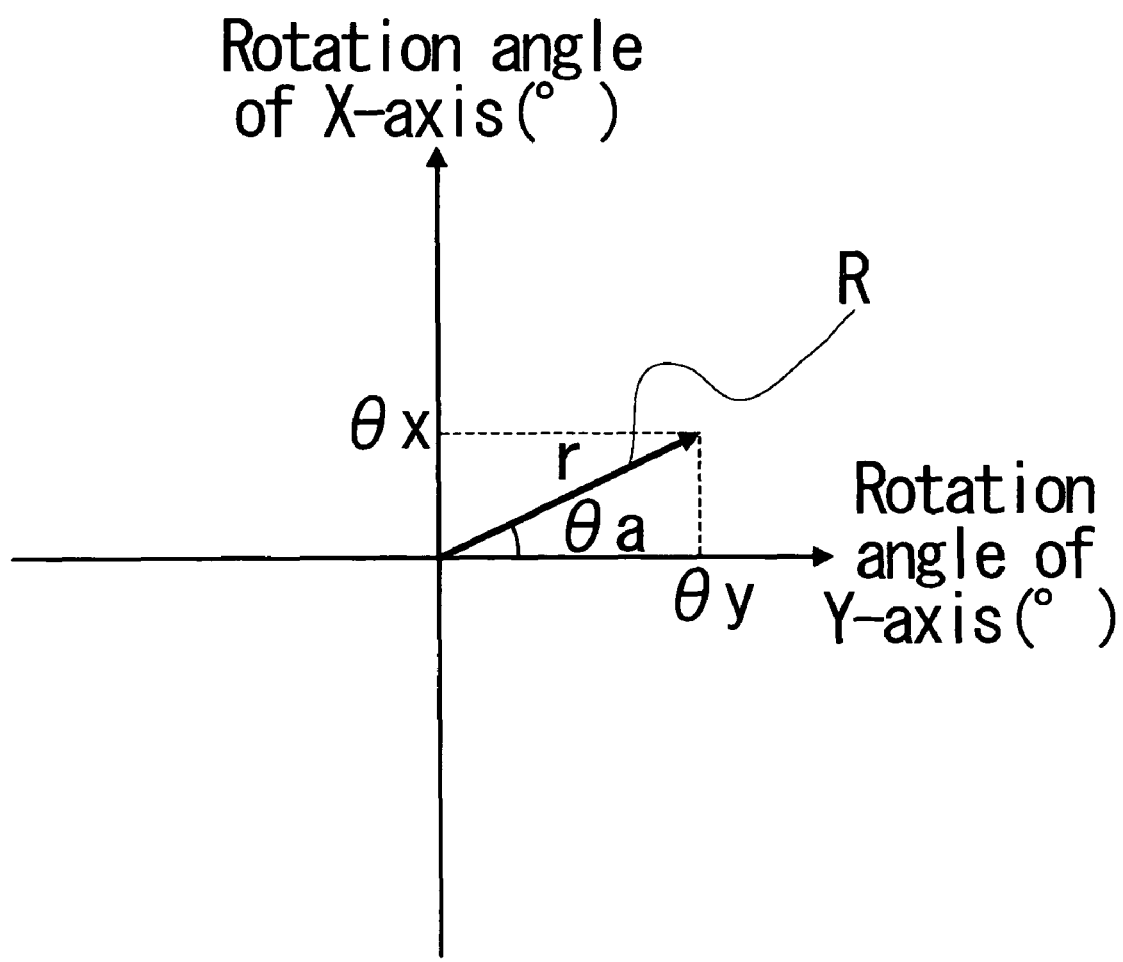

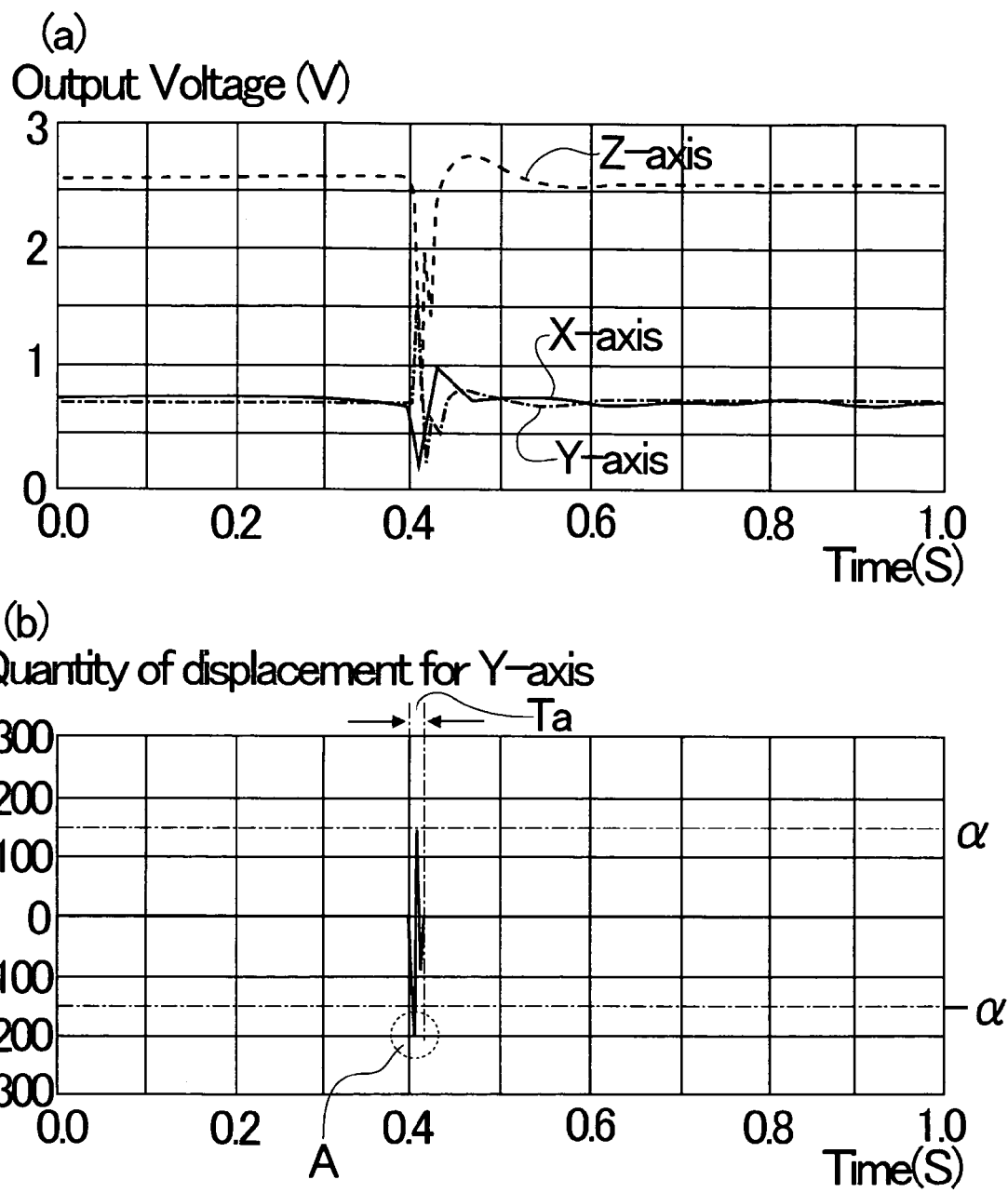
[FIG. 6]

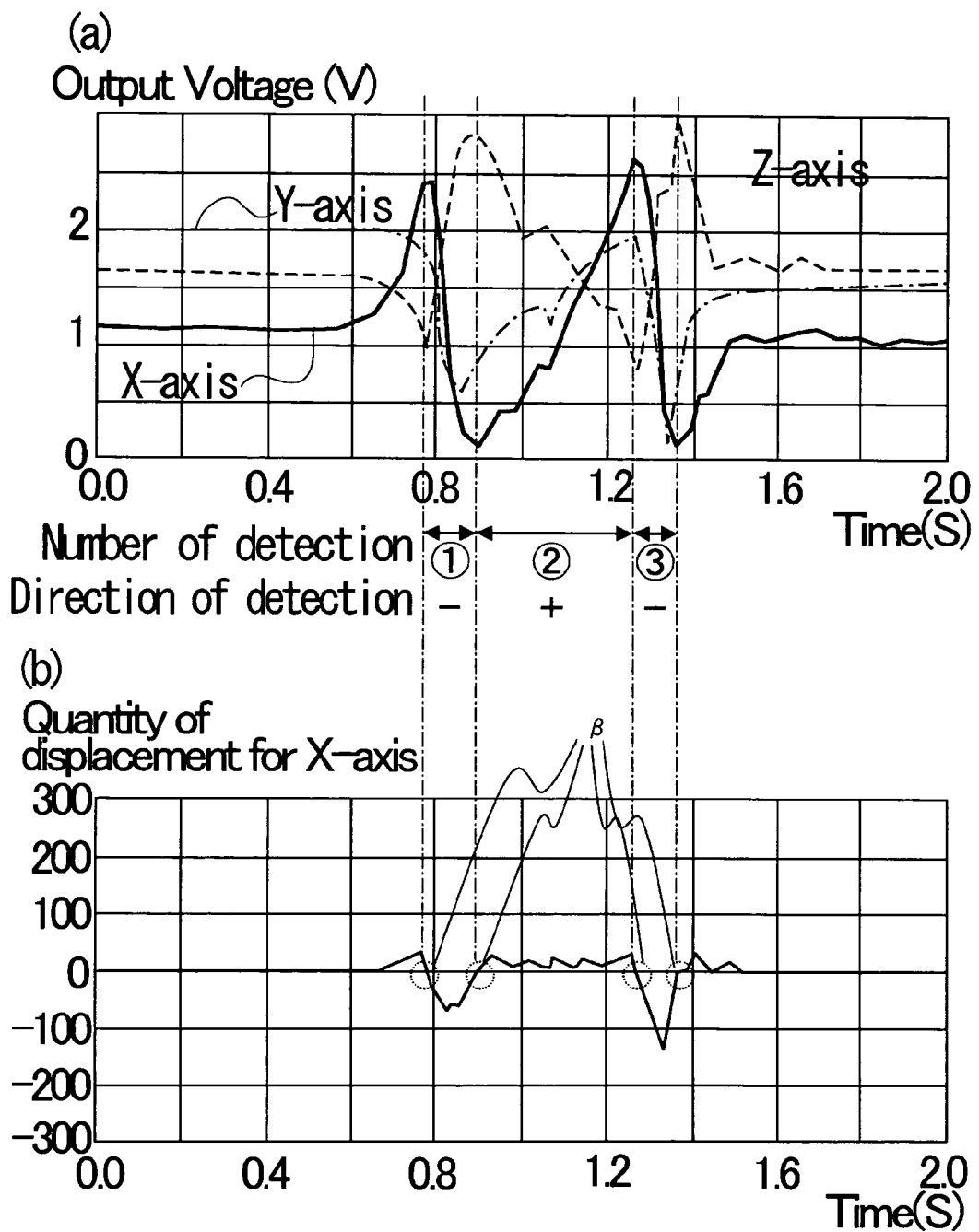
[FIG. 7]

[FIG. 8]
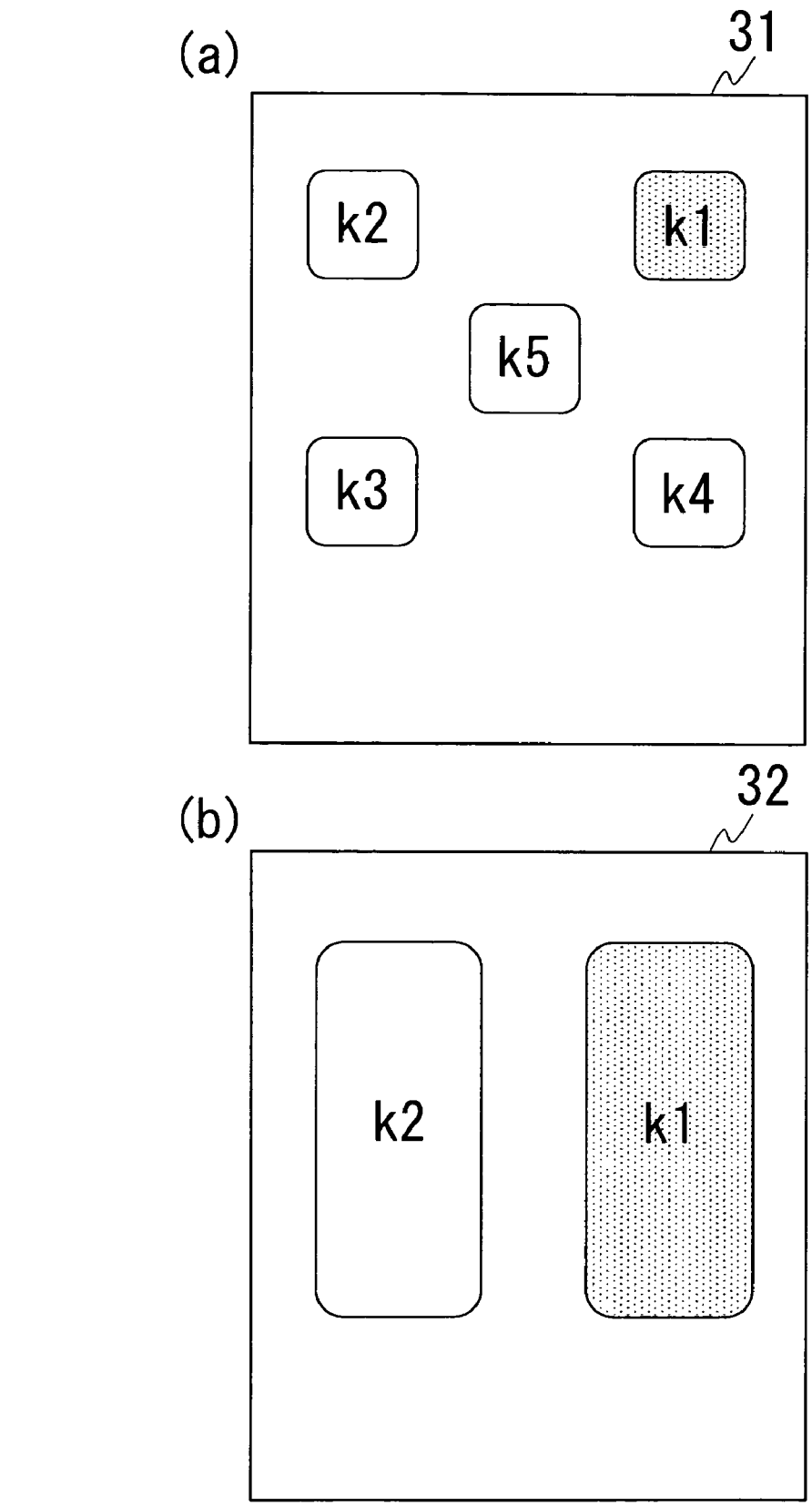

[FIG. 9]
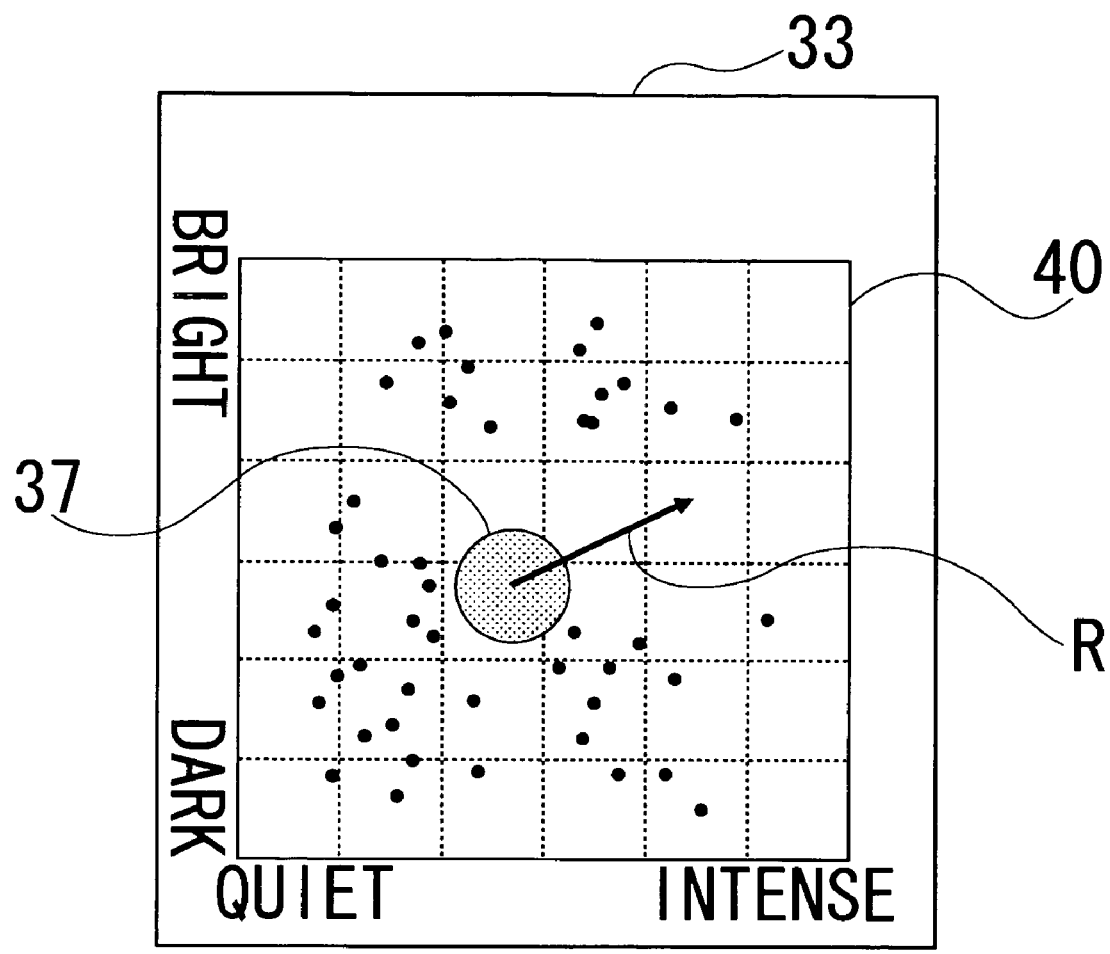

[FIG. 10]
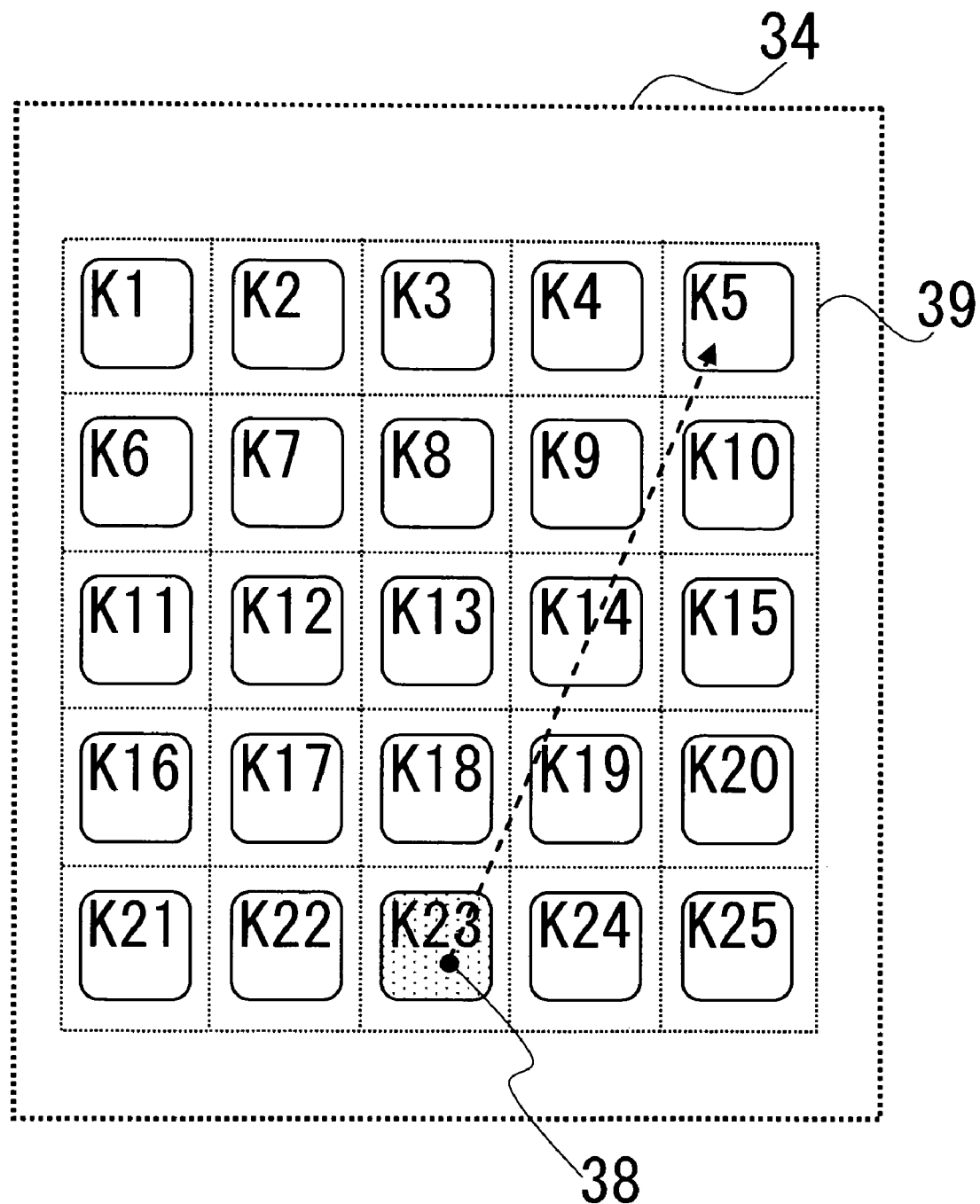

[FIG. 11]
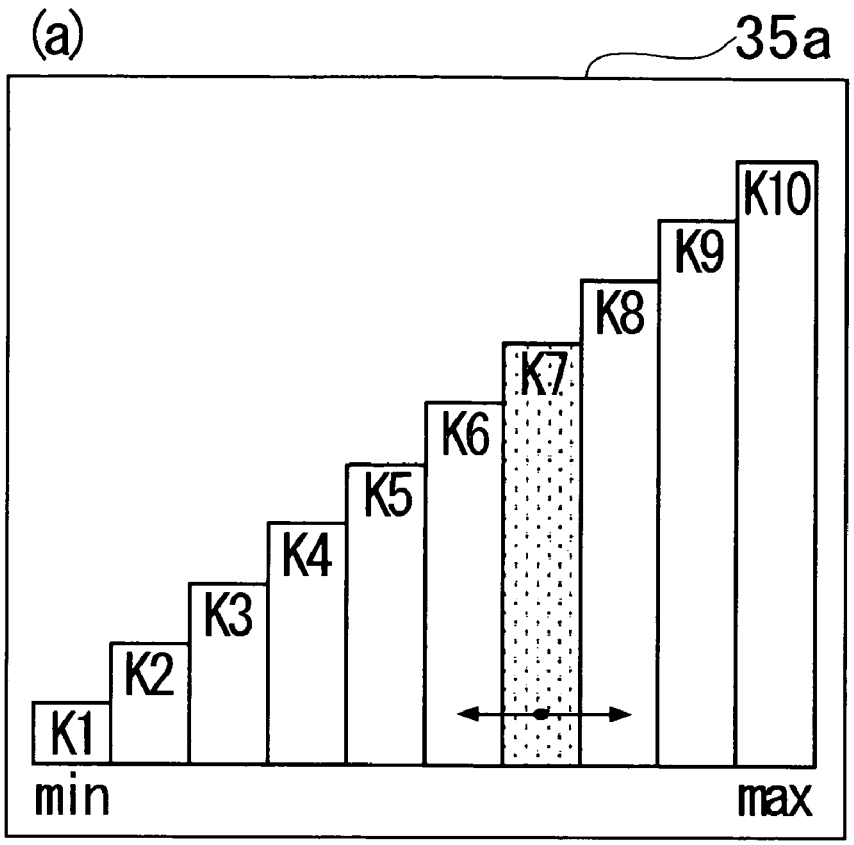
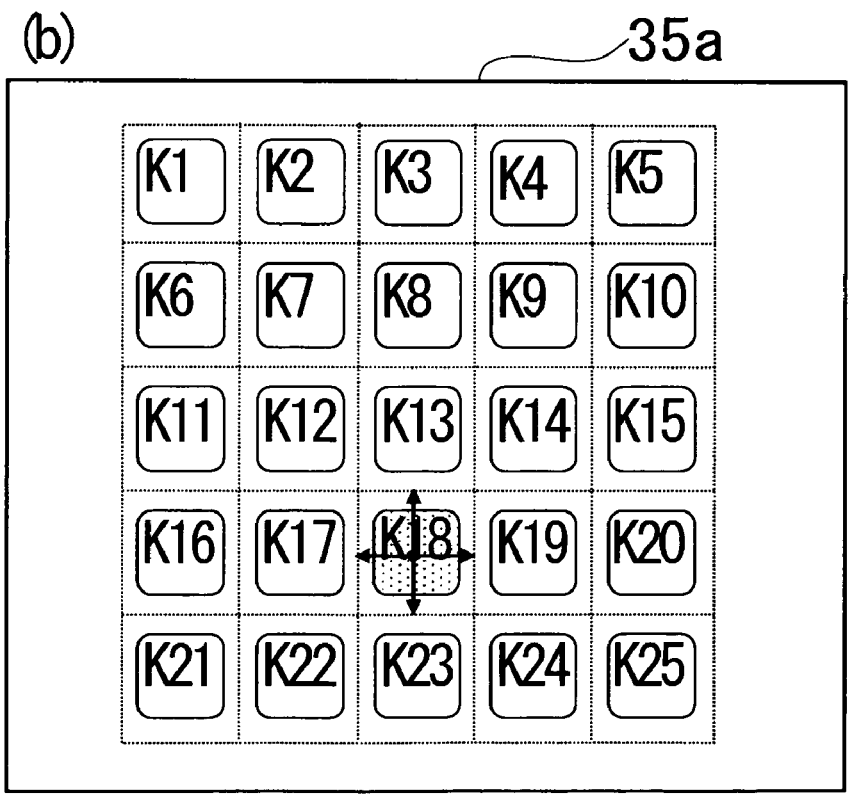

[FIG. 12]
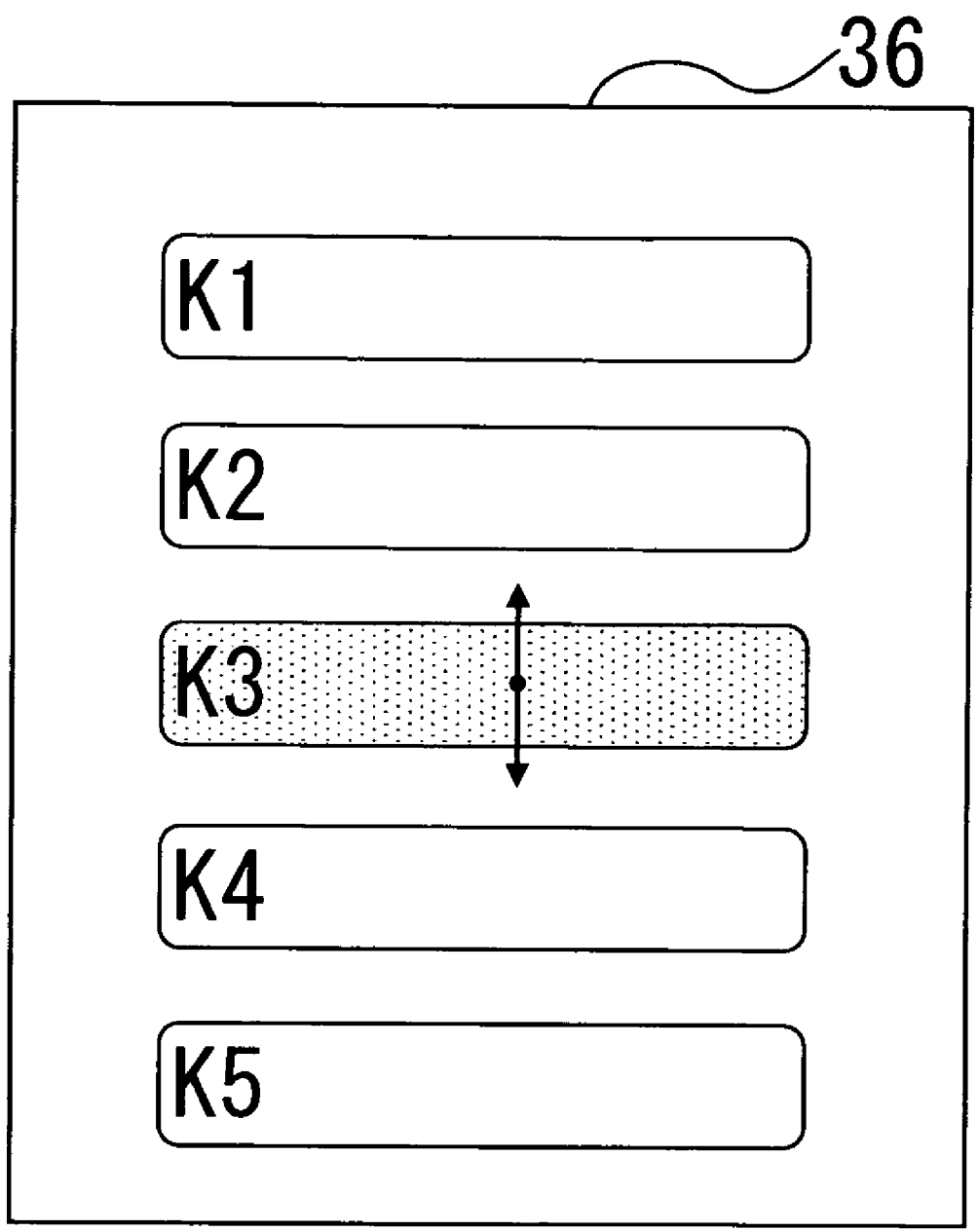

[FIG. 13]
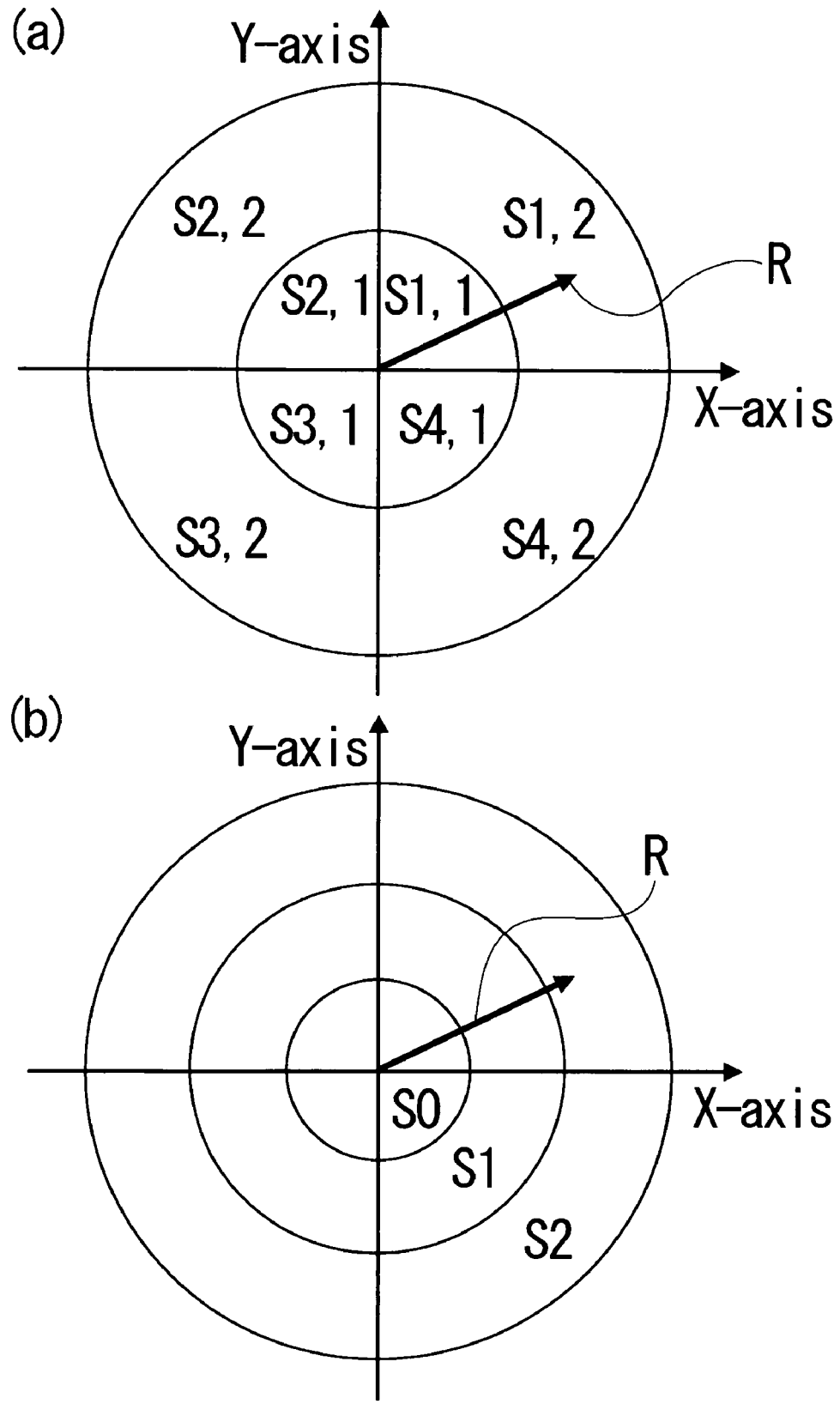

| Cell $S_{m,n}$ | Indication key $K_m$ |
|---|---|
| S1, 1 | K5 |
| S1, 2 | K1 |
| S2, 1 | K5 |
| S2, 2 | K2 |
| S3, 1 | K5 |
| S3, 2 | K3 |
| S4, 1 | K5 |
| S4, 2 | K4 |

(b)

| Cell $S_{m,n}$ | Indication key $K_m$ |
|---|---|
| S1, 1 | K1 |
| S1, 2 | K1 |
| S2, 1 | K2 |
| S2, 2 | K2 |
| S3, 1 | K2 |
| S3, 2 | K2 |
| S4, 1 | K1 |
| S4, 2 | K1 |

[FIG. 15]

| Cell Sn | Amount of movements | Speed |
|---|---|---|
| S0 | L0 | A0 |
| S1 | L1 | A1 |
| S2 | L2 | A2 |

[FIG. 16]
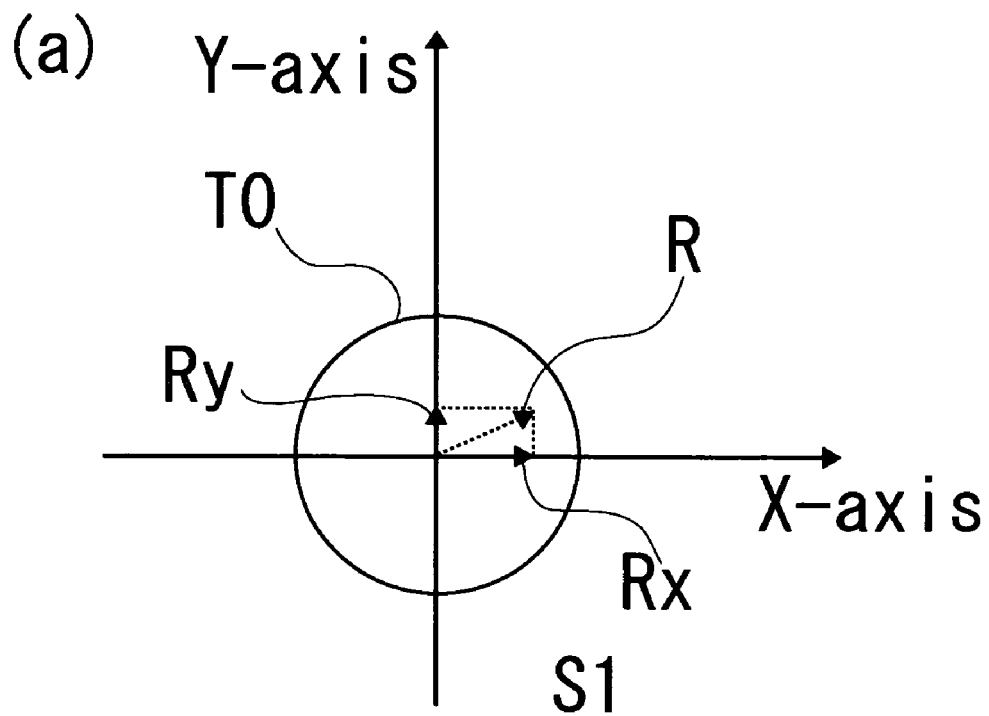
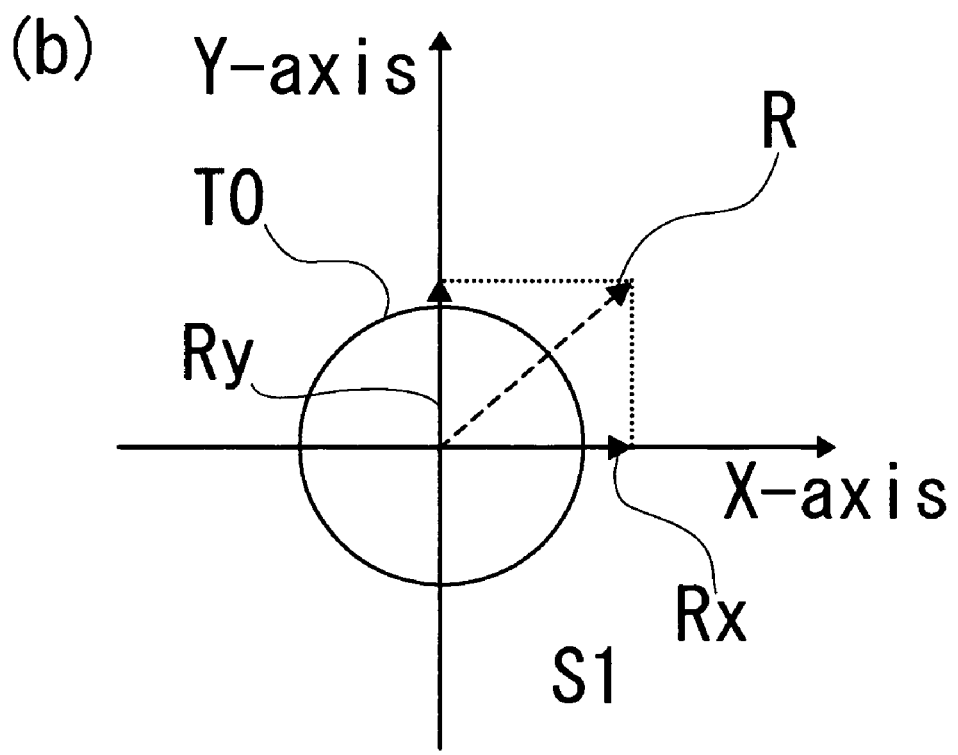

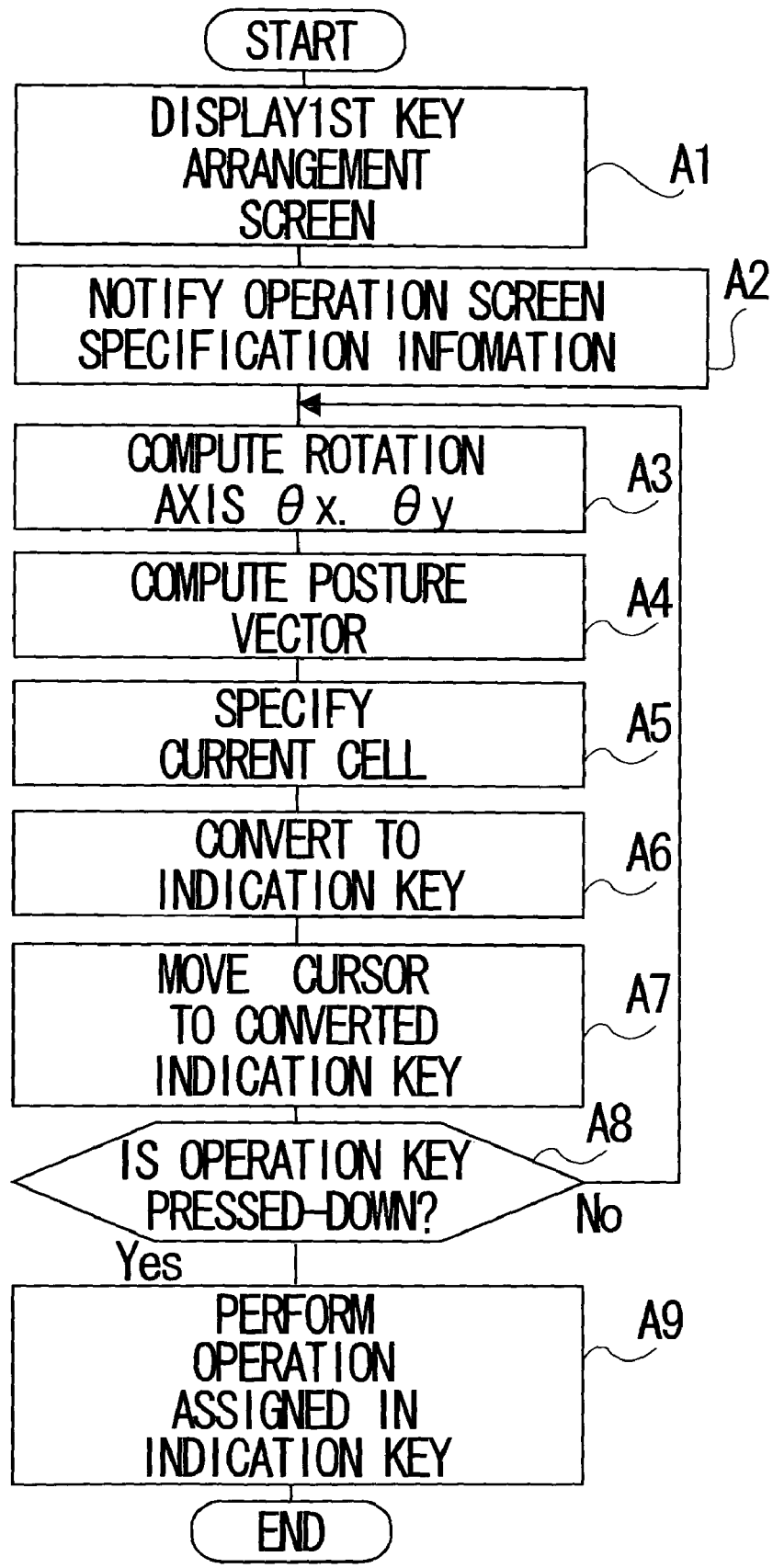
[FIG. 17]

[FIG. 18]
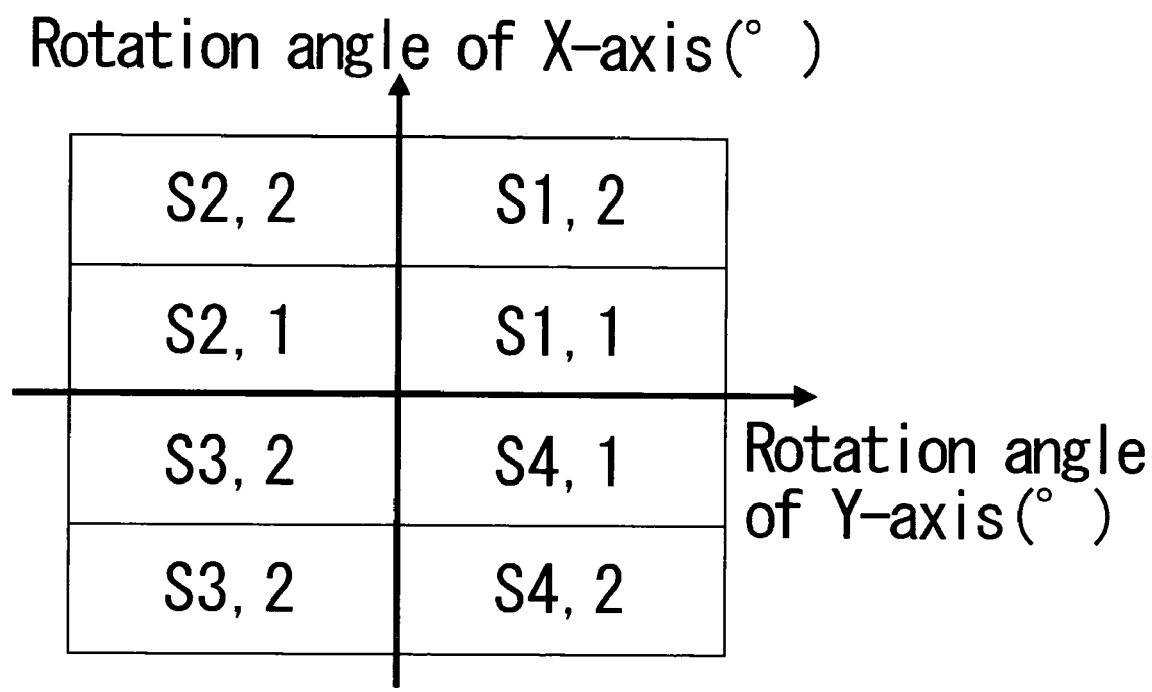

[FIG. 19]
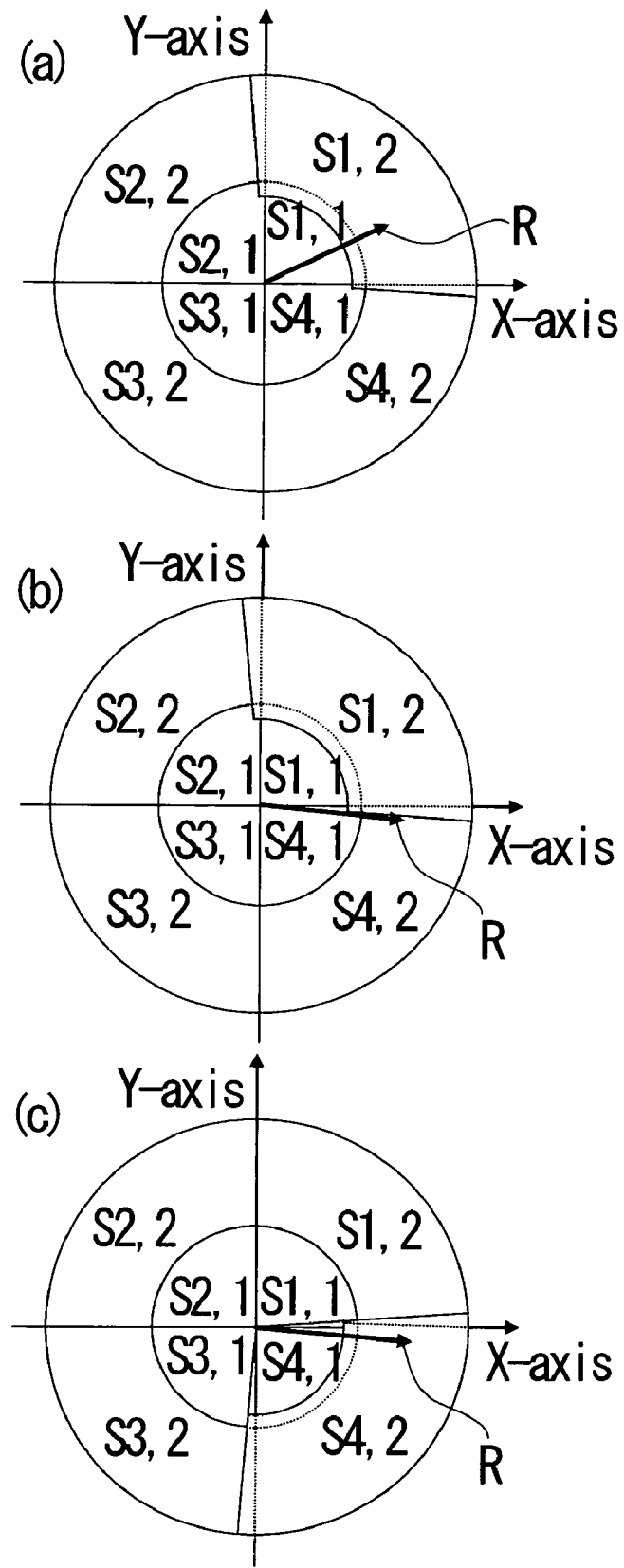

[FIG. 20]
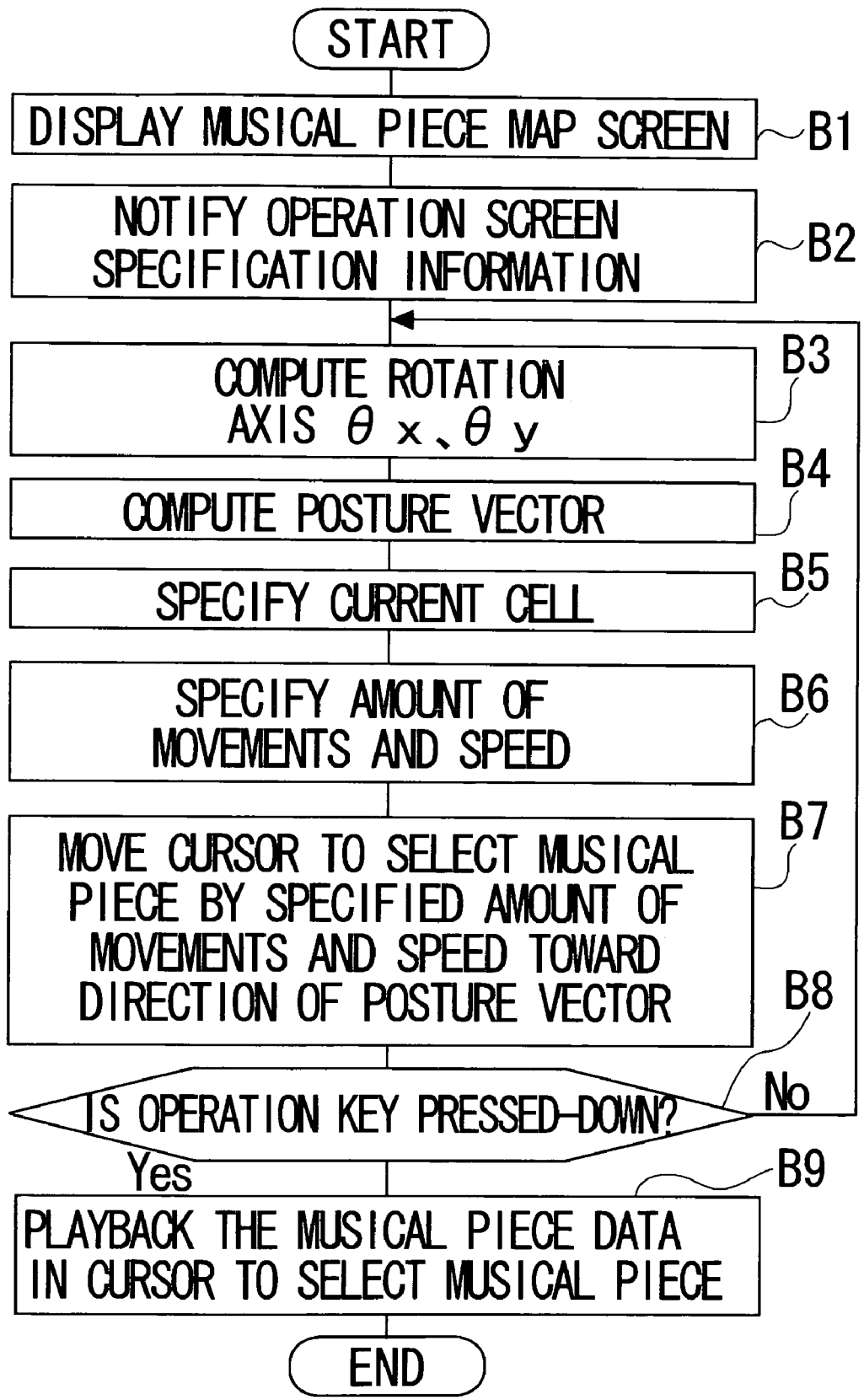

[FIG. 21]
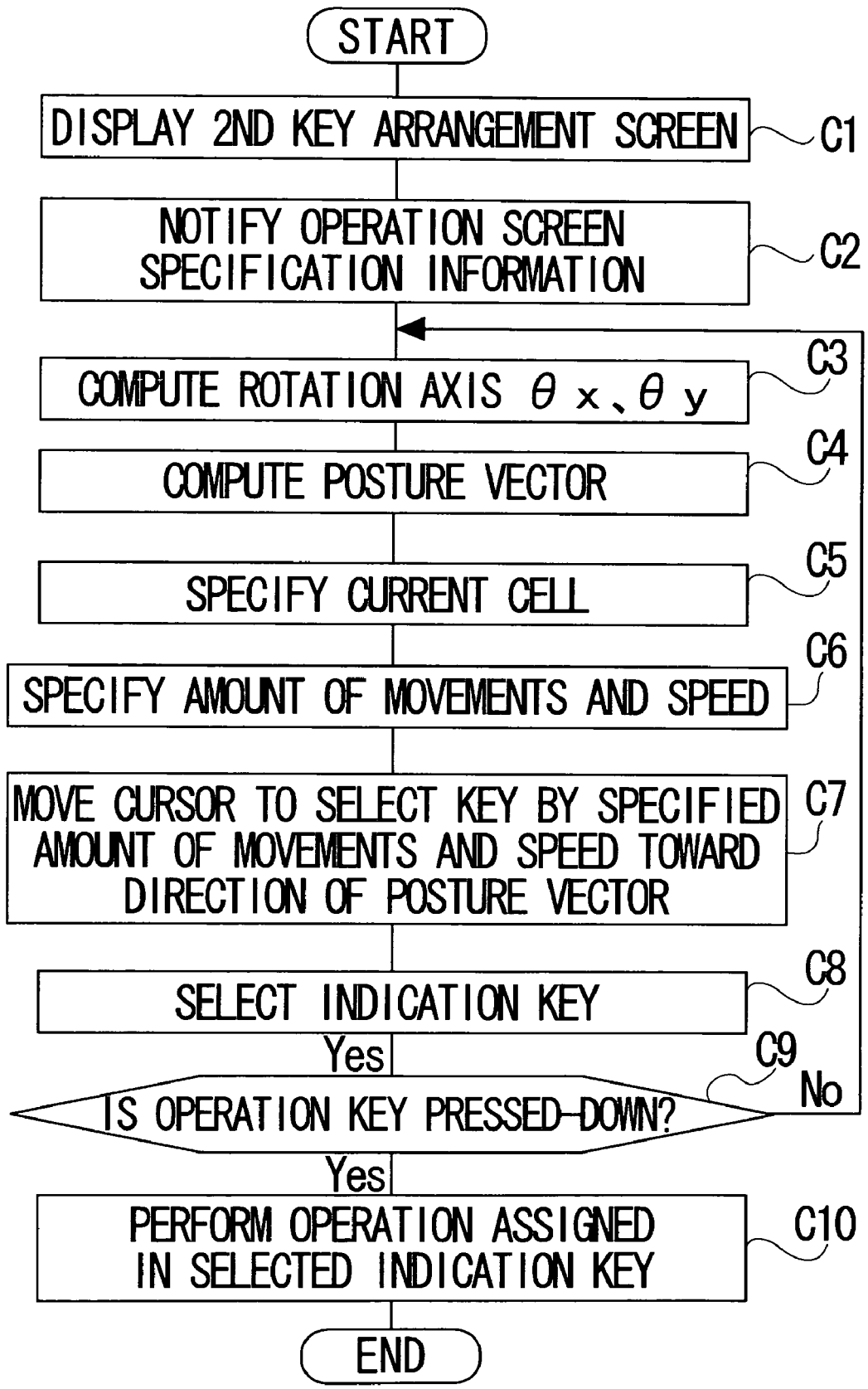

[FIG. 22]
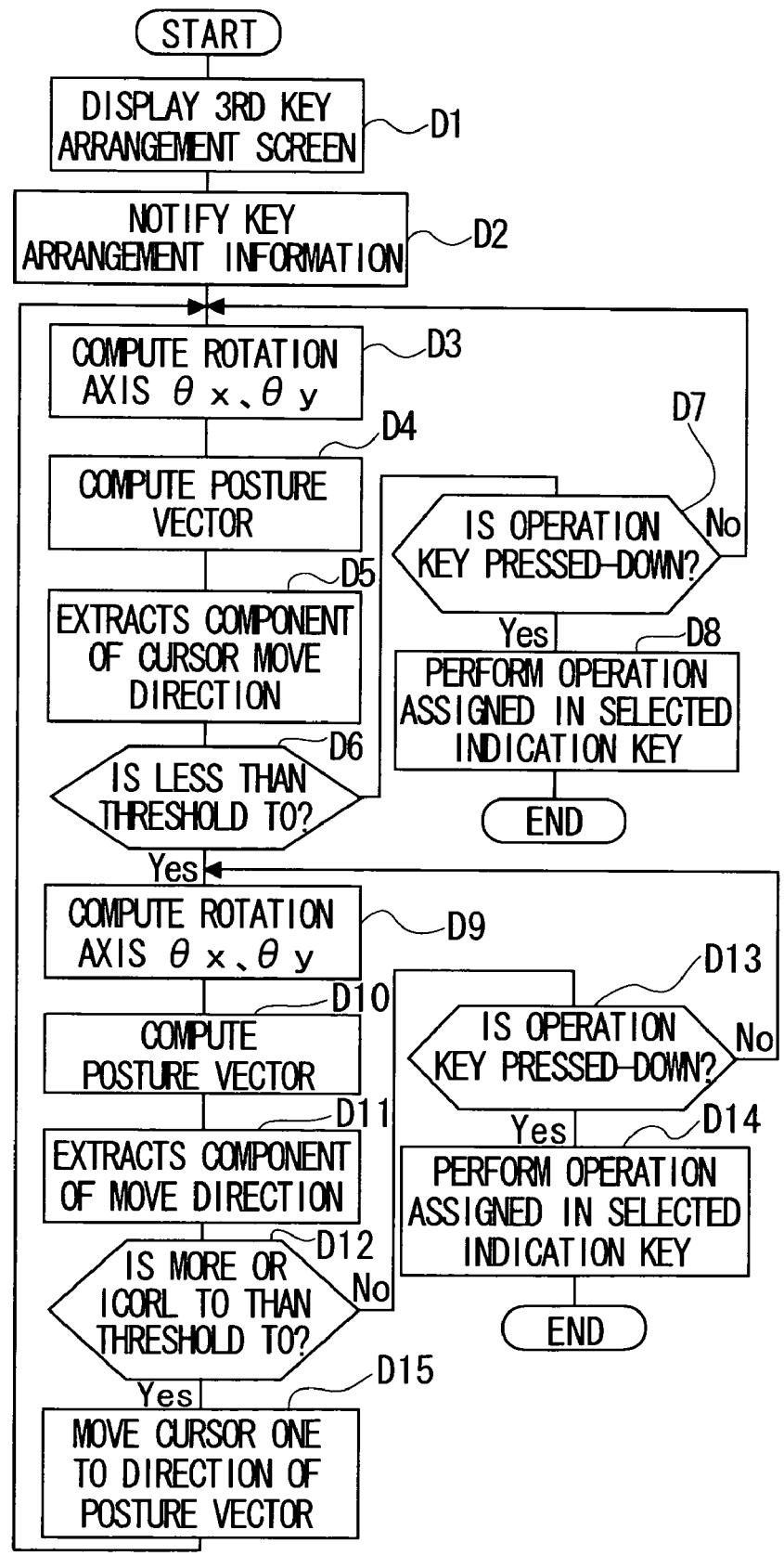

[FIG. 23]
(a)
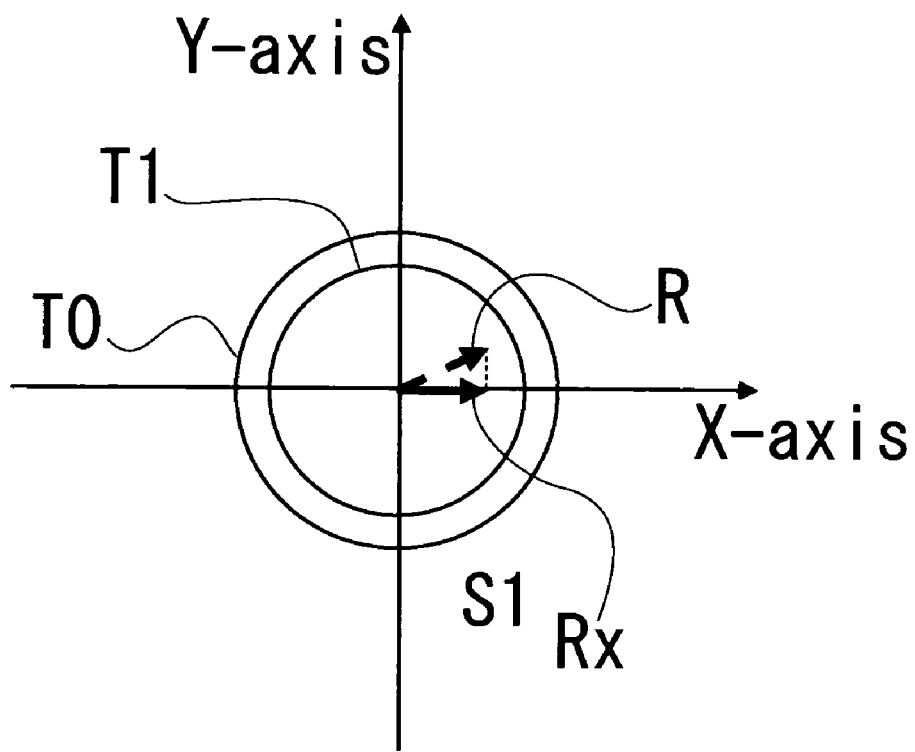
(b)
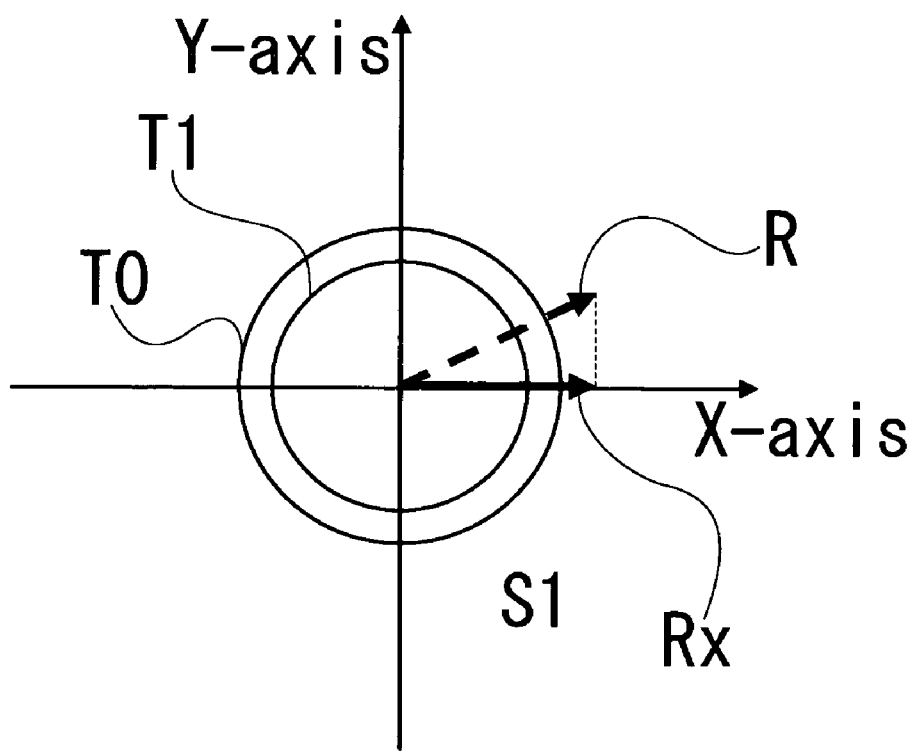

[FIG. 24]
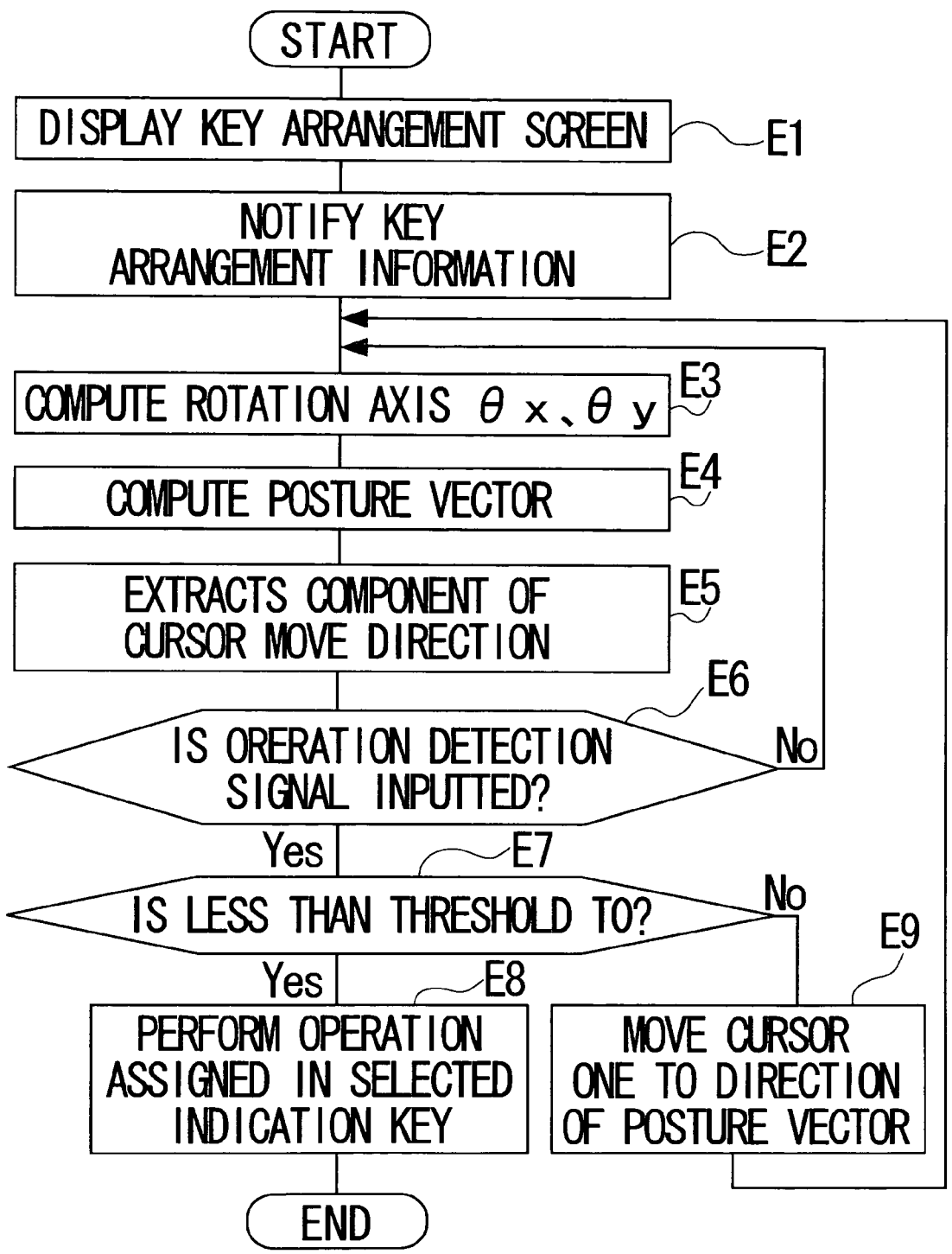

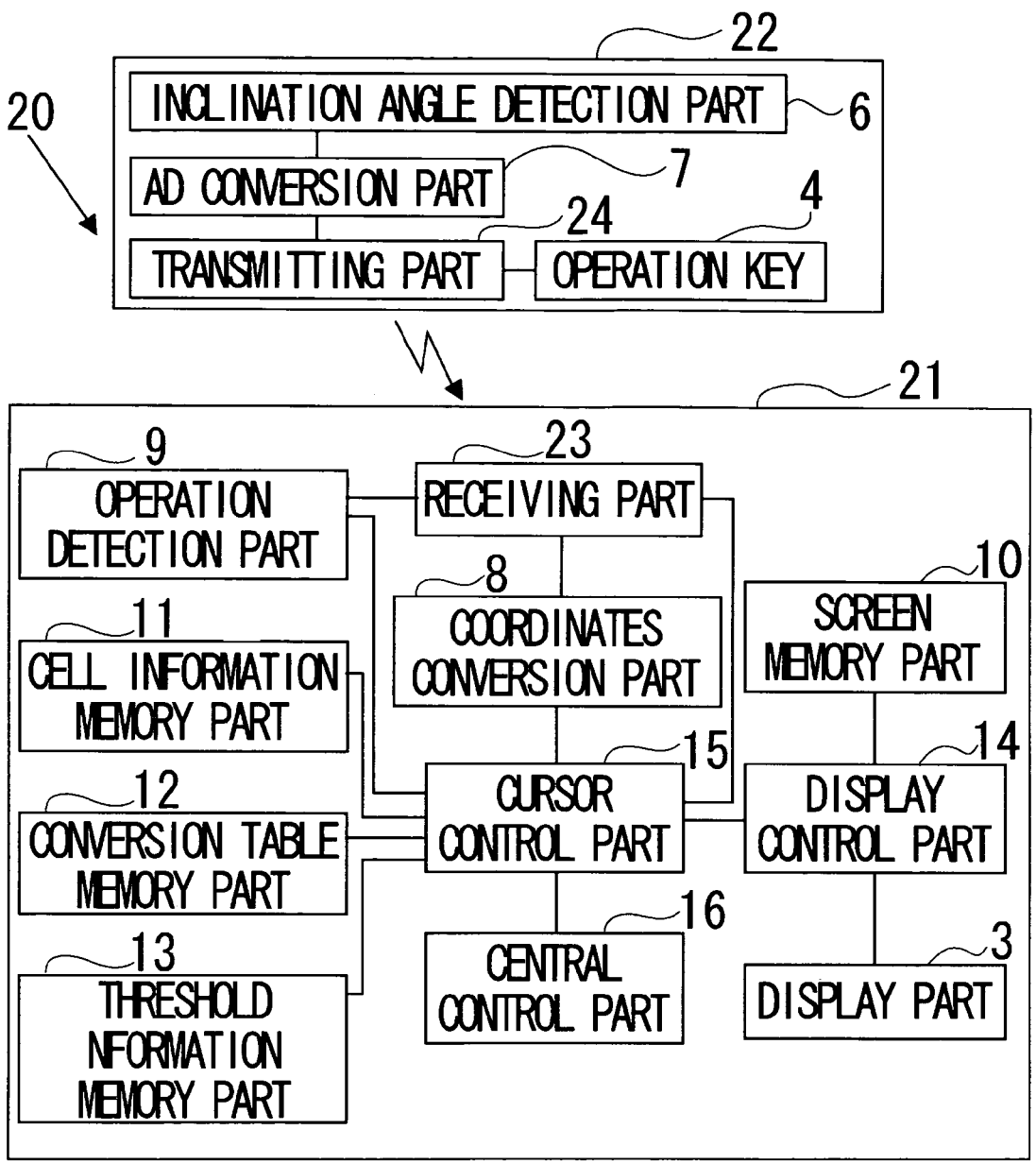
[FIG. 25]

OPERATION EQUIPMENT AND OPERATION SYSTEM

BACKGROUND OF THE INVENTION

1. Field of the Invention

The present invention relates to an operation equipment and an operation system which are used for a portable device which playbacks musical piece data recorded on recording media (HDD, CD, MD or the like) and a remote control equipment for operating various electric devices by remote control, wherein the operation equipment and the operation system which can grasp equipment and can operate it easily especially by one hand.

2. Description of the Related Art

On-screen operations using a display is adopted to the portable device which playbacks the musical piece data recorded on recording media (HDD, CD, MD or the like) and the remote control equipment for operating various electric devices by remote control because neither of them can respond with button(s) provided in equipment from the necessity of performing various operations with providing multi-function for an equipment. Although it is common to select a plurality of indication keys arranged on an operation screen indicated on the display in on-screen operation by operation method, such as an up/down key, a cross key and a jog shuttle, it is difficult for elderly people or an unfamiliar user to smoothly operate a up/down key, a cross key, a jog shuttle or the like.

Thus, it is proposed the conventional technology which selects the indication key displayed near center of the operation screen by: detecting a inclination angle of equipment from a signal acquired from an acceleration sensor, making the indication key move on the operation screen every moment based on the inclination angle of equipment, and displaying; without using the operation method, such as the up/down key, the cross key, the jog shuttle or the like (for example, see reference 1).

However, in order to move the indication key on the operation screen every moment based on the inclination angle of equipment and to move a desired indication key near the center of an operation screen with the conventional technology, a plurality of operation that equipment keeps it on a level after inclining in directions of: front and rear, and left have to be combined; thus, there is a problem that either of the plurality of indication keys arranged on the operation screen can not be directly selected according to a posture of equipment.

Moreover, there is a problem in the conventional technology that the operation to select the indication key arranged by diagonal direction will become complicated because the equipment is made to select the desired indication key by inclining in: front and rear, right and left directions, and the indication key on an operation screen is moved vertically and horizontally; the combination of the operation of the equipment inclining in: front and rear, right and left directions is required.

Moreover, there is a problem in the conventional technology that it is difficult to make a cursor stop the desired indication key if it have not got used to operation of inclining the equipment because the equipment is composed to select the desired indication key vertically and horizontally by inclining in: front and rear, right and left directions with keeping the equipment on a level when the indication key on an operation screen is moved to the desired indication key in the center; if it makes a mistake in the timing which returns the equipment on a level, the indication key before the desired indication key is selected, or the desired indication key is passed and moved.

Furthermore, in the conventional technology, since there is only one kind of a selection control of the indication key based on the inclination angle of the equipment, there is a problem that the indication key suitable for each operation screen is not able to be selected when there are a plurality of operation screens in which arrangements of indication keys are different.

[Patent Document 1]
Japanese patent publication No. 2003-162371, A

SUMMARY OF THE INVENTION

[Problem(s) to be Solved by the Invention]

The present invention is made in view of the above problem, and the purpose is providing the operation equipment and the operation system, which can select directly either of the plurality of indication keys, arranged on the operation screen according to a posture of equipment, and can select a desired indication key in one operation of inclining the equipment.

Moreover, the purpose of the present invention is providing the operation equipment and the operation system which can move a cursor to select musical piece on a screen of musical piece map and a cursor to select key on a key arrangement screen to arbitrary directions according to the inclination of equipment with selecting desired musical piece data or the desired indication key by simple operation(s).

Moreover, the purpose of the present invention is providing the operation equipment and the operation system which the cursor can be certainly moved to the adjoined indication key by inclining the equipment and can make stop to the desired indication key certainly even if it is not got used to operation of inclining the equipment.

Moreover, the purpose of the present invention is providing the operation equipment and the operation system that can raise an operational capacity of cursor movement in each operation screen based on the inclination angle of the equipment by adopting move control of the cursor suitable for each operation screen.

[Means for Solving the Problem]

The present invention is comprised as follows for solving the above-mentioned subjects:

the operation equipment of the present invention use operation screen arranged two or more indication keys, which each key is assigned different operation, with selecting either of two or more the indication keys by a cursor, wherein providing a method to detect the inclination angle which detect inclination of the equipment and output a posture signal and a method to control cursor which specify the either of two or more the indication keys based on the posture signal from this method to detect inclination angle and move the cursor.

Furthermore, the operation equipment of the present invention has a characteristics, wherein it is equipped with a method to calculate rotation angle to compute the rotation angle of a X-axis and a Y-axis which are parallel to a main surface part and perpendicularly intersect mutually based on the posture signal from the method to detect inclination angle as an X-axis rotation angle and a Y-axis rotation angle, respectively; The method to control cursor is specifying either of two or more indication keys based on the X-axis rotation angle and the Y-axis rotation angle which are computed by the method to calculate rotation angle, and it moves the cursor.

Furthermore, the operation equipment of the present invention is, wherein:

it is equipped with a method to memorize cell information memorizing a cell information consist of two or more cells and a method to memorize conversion table memorizing a conversion table which associates each cell of the cell information memorized by the method to memorize cell information with the indication key;

the method to control cursor is specifying the indication key which is associated with the current cell by using the conversion table and moving cursor while specifying one cell in the cell information as a current cell based on the X-axis rotation angle and the Y-axis rotation angle which are computed by the method to calculate rotation angle.

Moreover, the operation equipment of the present invention is an operation equipment which select the musical piece data from the cursor to select musical piece which shows a domain on the musical piece map by using the screen of musical piece map where the musical piece map unfolding two or more musical piece data is arranged, wherein:

it is equipped with the method to detect inclination angle which detects inclination of the equipment and outputs the posture signal, the method to control cursor which moves the cursor to select musical piece to direction which the equipment inclines based on the posture signal from this method to detect inclination angle and select the musical piece data located in the cursor to select musical piece.

Moreover, the operation equipment of the present invention is an operation equipment which operates with selecting either of two or more the indication keys from the cursor to select key by using the key arrangement screen arranged two or more the indication keys, which the different operations are assigned to, wherein:

it is equipped with the method to detect inclination angle which detects inclination of the equipment and outputs the posture signal, the method to control cursor which the cursor to select key is moved to direction which the equipment inclines based on the posture signal from this method to detect inclination angle and select the indication key in which the cursor to select key is located.

Furthermore, the operation equipment of the present invention is, wherein:

it is provided two or more indication key domains that adjoins mutually and corresponds to two or more the corresponding indication keys arranged on the key arrangement screen;

the cursor to select key, by which the movement is controlled by the method to control cursor, is located in either of two or more the indication key domains and is selected the indication key corresponding to the indication key domain in which the cursor to select key is located.

Moreover, the operation equipment of the present invention is an operation equipment which operates with selecting either of two or more the indication keys from the cursor by using the key arrangement screen arranged two or more the indication keys, which the different operations are assigned to, wherein:

it is equipped with the method to detect inclination angle which detects inclination of the equipment and outputs the posture signal and a method to control cursor which extracts an inclination of arrangement direction of the indication key based on the posture signal from this method to detect inclination angle with moving the cursor to one for the direction toward the indication key which adjoins direction of the extracted inclination when the extracted inclination is changed from less than to greater than or equal to the first threshold previously set.

Furthermore, the operation equipment of the present invention is, wherein:

if the arrangement direction of the indication key is two directions, the inclinations of two directions, which are the arrangement direction of the indication key based on the posture signal by the method to detect to detect inclination angle, are extracted, respectively;

if both of the extracted two directions are changed from the less than the threshold 1 to greater than or equal to the first threshold, the cursor is moved to one to the extracted two directions, respectively.

Furthermore, the operation equipment of the present invention is characterized in that:

it is equipped with a method to compute a posture vector which shows the direction and how much inclined by being composition of a X-axis rotation angle and a Y-axis rotation angle, which the respective rotation angles of the X-axis and the Y-axis which are parallel to the main surface part and perpendicularly intersect mutually is computed based on the posture signal from the method to detect inclination angle as the X-axis rotation angle and the Y-axis rotation angle, respectively;

the method to control cursor is extracting inclination of arrangement direction of the indication key from the posture vector computed by the method to calculate rotation angle.

Furthermore, the operation equipment of the present invention is characterized in that:

if the arrangement directions of the indication key are two directions, the inclinations of two directions, which are the arrangement direction of the indication key, are extracted based on the posture signal by the method to detect to detect inclination angle, respectively;

if both of the extracted two directions are changed from less than to greater than or equal to the first threshold, the cursor is moved to one to the extracted two directions, respectively.

The operation equipment of the present invention is an operation equipment which operates with selecting either of two or more the indication keys from the cursor to select key by using the key arrangement screen arranged two or more the indication keys, which the different operations are assigned to, wherein:

it is equipped with the method to detect inclination angle of the equipment which detect inclination angle of the equipment, a method to detect an operation which detect a predetermined operation for the equipment based on the posture signal, a method to control cursor which moves the cursor to one for the indication key adjoining the direction to which the equipment is inclined if the predetermined operation is detected by this method to detect a determined operation.

Furthermore, the operation equipment of the present invention is, wherein:

the method to control cursor is, with extracting the inclination of arrangement direction of the indication key based on the posture signal, if the predetermined operation is detected by the method to detect operation, it compares with the threshold, which is previously set, and the inclination in the arrangement direction of the indication key before the predetermined operation is executed to the equipment, and the cursor is moved one to the indication key which adjoins the direction of the extracted inclination when the inclination is the grater than or equal to the threshold.

Furthermore, the operation equipment of the present invention is, wherein:

it is equipped a central control method to execute the operation assigned to the indication key in which the cursor is located if the inclination in the arrangement direction of the indication key before the predetermined operation is executed to the equipment is less than the threshold.

Moreover, the operation equipment of the present invention is an operation equipment which displays alternatively two or more operation screens arranged two or more indication keys, which the different operations are assigned to, on the method to display, and operate it by selecting either of two or more the indication keys with cursor, wherein:

it equipped with the method to detect inclination angle which detects inclination of the equipment and output the posture signal, a method to control cursor with using properly according to the operation screen either a first cursor move control which specifies either of two or more the indication keys based on the posture signal and moves the cursor, or a 2nd cursor move control based on the posture signal, which moves the cursor in different logic from the 1st cursor move control.

Furthermore, the operation equipment of the present invention is, wherein:

the method to control cursor makes the cursor moved to the direction which the equipment inclines as the 2nd cursor move control based on the posture signal, and it makes the indication key selected in which the cursor is located.

Furthermore, the operation equipment of the present invention is, wherein:

the method to control cursor makes the cursor to select musical piece which shows the domain on the musical piece map moved to direction which the equipment inclines based on the posture signal as the 2nd cursor move control, and it make the musical piece data, which are located in the cursor to select musical piece, selected if the screen of musical piece map, where the musical piece map unfolding two or more musical piece data is arranged, is displayed on the method to display.

Moreover, the operation equipment of the present invention is, wherein:

the method to control cursor extracts the inclination of arrangement direction of the indication key based on the posture signal as the 2nd cursor move control, and the cursor is moved one to the indication key which adjoins the direction of the extracted inclination when the extracted inclination becomes from less than to grater than or equal to the first threshold previously set.

Moreover, the operation equipment of the present invention is, wherein:

it is equipped with the method to detect operation that detects the predetermined operation based on the posture signal;

the method to detect cursor, as 2nd cursor move control, moves the cursor one to the indication key adjoining the direction to which the equipment inclined if the predetermined operation is detected by this method to detect a determined operation.

Furthermore, the operation equipment of the present invention is an operation equipment which displays alternatively two or more operation screens arranged two or more indication keys, which the different operations are assigned to, on the method to display, and operate it by selecting either of two or more the indication keys with cursor, wherein:

it equipped with a method to control cursor with using properly according to the operation screen either the first cursor move control which make the cursor moved to the direction, which the equipment is inclined, based on the posture signal and select the indication keys in which the cursor is located, or the 2nd cursor move control which moves the cursor in different logic from the 1st cursor move control based on the posture signal.

Furthermore, the operation equipment of the present invention is, wherein:

the method to control cursor extracts the inclination of arrangement direction of the indication key based on the posture signal as the 2nd cursor move control, and the cursor is moved one to the indication key which adjoins the direction of the extracted inclination when the extracted inclination becomes from less than to grater than or equal to the first threshold previously set.

Furthermore, the operation equipment of the present invention is, wherein:

it is equipped with the method to detect operation that detects the predetermined operation based on the posture signal;

the method to detect cursor, as 2nd cursor move control, moves the cursor one to the indication key adjoining the direction to which the equipment is inclined if the predetermined operation is detected by this method to detect the predetermined operation.

Furthermore, the operation system of the present invention comprises a body equipment with a remote control equipment which operates the body equipment, and it is the operation system which operates from selecting either of two or more the indication keys from the cursor by using the operation screen where two or more indication keys are arranged, which each key is assigned the different operation, wherein:

the remote control equipment is equipped with the method to detect inclination angle which detects inclination of the remote control equipment and output the posture signal, the operation key which indicates execution of the operation assigned to the indication key in which the cursor is located, a method to transmit which transmit the posture signal outputted from the method to detect inclination angle and the press-down signal of the operation key;

the body equipment is equipped with a method to receive which receive the posture signal and the press-down signal, a method to display which display the operation screen, the method to control cursor which specifies either of two or more the indication keys based on the posture signal received by the method to receive and moves the cursor and a method of central control which executes the operation assigned to the indication key in which the cursor is located based on the press-down signal of the operation key received by the method to receive.

Furthermore, the operation system of the present invention comprises the body equipment and the remote control equipment which operates the body equipment, and it is an operation system which select the musical piece data from the cursor to select musical piece which shows the domain on the musical piece map by using the screen of musical piece map where the musical piece map unfolding two or more musical piece data is arranged, wherein:

the remote control equipment is equipped with the method to detect inclination angle which detects inclination of the remote control equipment and output the posture signal, the indication key which indicates for playing back the musical piece data selected by the cursor to select piece, the method to receive which receive the posture signal outputted from the method to detect inclination angle and the press-down signal of the operation key;

the body equipment is equipped with a method to receive which receive the posture signal and the press-down signal, a method to display which display the screen of musical piece map, the method to control cursor which moves the cursor to select musical piece to direction which the remote control equipment inclines based on the posture signal received by the method to receive and select the musical piece data located in the cursor to select musical piece, and a method of central control which execute to play back the musical piece data selected by the cursor to select musical piece data.

Furthermore, the operation system of the present invention comprises the body equipment with the remote control equipment which operates the body equipment, and it is the operation system which operates from selecting either of two or more the indication keys from the cursor to select key by using the key arrangement screen where two or more indication keys, which the different operations are assigned to, are arranged, wherein:

the remote control equipment is equipped with the method to detect inclination angle which detects inclination of the remote control equipment and output the posture signal, the operation key which indicates execution of the operation assigned to the indication key in which the cursor is located, the method to transmit which transmit the posture signal outputted from the method to detect inclination angle and the press-down signal of the operation key;

the body equipment is equipped with the method to receive which receives the posture signal and the press-down signal, the method to display which display the key arrangement screen, and a method of central control which executes the operation assigned to the indication key in which the cursor to select key is located based on the press-down signal of the operation key received by the method to receive.

Furthermore, the operation system of the present invention comprises the body equipment with the remote control equipment which operates the body equipment, and it is the operation system which operates by selecting either of two or more the indication keys from the cursor to select key by using the key arrangement screen where two or more indication keys, in which the different operation is assigned to, are arranged, wherein:

the remote control equipment is equipped with the method to detect inclination angle which detects inclination of the remote control equipment and output the posture signal, the operation key which indicates execution of the operation assigned to the indication key in which the cursor to select key is located, a method to receive which receive the posture signal outputted from the method to detect inclination angle and the press-down signal of the operation key;

the body equipment is equipped with a method to receive which receive the posture signal and the press-down signal, the method to display which display the key arrangement screen, the method to control cursor which extracts the inclination of arrangement direction of the indication key based on the posture signal from the method to detect inclination angle with moving the cursor to one for the direction toward the indication key which adjoins direction of the extracted inclination when the extracted inclination is changed from less than to greater than or equal to the first threshold previously set, and a method of central control which executes the operation assigned to the indication key in which the cursor to select key is located based on the press-down signal of the operation key received by the method to receive.

Moreover, the operation system of the present invention comprises the body equipment and the remote control equipment which operates the body equipment, and it is the operation system which operates by selecting either of two or more the indication keys from the cursor to select key by using the key arrangement screen where two or more indication keys, which the different operations are assigned to, are arranged, wherein:

the remote control equipment is equipped with the method to detect inclination angle that detects inclination of the remote control equipment and output the posture signal, a method to transmit which transmits the posture signal outputted from the method to detect inclination angle;

the body equipment is equipped with the method to receive which receives the posture signal, the method to display which display the key arrangement screen, and the method to detect operation which detect the predetermined operation to equipment based on the posture signal received by the method to receive, the method to control cursor which move the cursor to one for the indication key adjoining the direction to which the equipment is inclined if the predetermined operation is detected by this method to detect a determined operation.

[Effect of the Invention]

The operation equipment and the operation system of the present invention performs effects in that:

Either of the plurality of indication keys arranged on the operation screen can be directly selected according to the posture of the equipment, and the desired indication key can be selected in one operation of inclining the equipment since direction and the inclination angle of the equipment are directly related with selection of the indication key by specifying either of the plurality of indication keys;

because it is comprising with the rotation angle calculator to compute the rotation angle of the X-axis and the Y-axis which are parallel to a main surface part and perpendicularly intersect mutually based on the posture signal from the inclination angle detector as the X-axis rotation angle and the Y-axis rotation angle, respectively; the cursor controller is specifying either of the plurality of indication keys based on the X-axis rotation angle and the Y-axis rotation angle which are computed by the rotation angle calculator, and it moves the cursor.

Furthermore, the operation equipment and the operation system of the present invention performs effects in that:

if there are the plurality of operation screens where the arrangement (number and arrangement) of the indication key differs, it can be cope with only preparing a conversion table for every operation screen in which the arrangement of the indication key differs, even if the arrangement of the indication key arranged on the operation screen changes, it can be cope with respond easily;

because it is comprised that, with the cell information memory memorizing a cell information comprised of the plurality of cells, the conversion table memory memorizing a conversion table which associates each cell of the cell information memorized by the cell information memory with the indication key, and the cursor controller is specifying the indication key which is associated with the current cell by using the conversion table and moving cursor while specifying one cell in the cell information as the current cell based on the X-axis rotation angle and the Y-axis rotation angle which are computed by the rotation angle calculator.

Furthermore, the operation equipment and the operation system of the present invention performs effects in that:

since the cursor to select musical piece can be moved to a desired direction by inclining equipment to desired direction to move the cursor for selecting a musical piece, the cursor to select musical piece on a screen of musical piece map can be moved to the arbitrary directions according to the inclination of the equipment, and the desired musical piece data can be selected by simple operation;

because it is comprised that, when selecting the musical piece data from the cursor to select musical piece which shows the domain on the musical piece map by using the screen of musical piece map where the musical piece map unfolding the plurality of musical piece data is arranged, the inclination angle detector detects inclination of the equipment and outputs the posture signal; the cursor controller moves the cursor to select musical piece to the direction which the equipment inclines based on the posture signal from this inclination angle detector; and select the musical piece data located in the cursor to select musical piece.

Furthermore, the operation equipment and the operation system of the present invention performs effects in that:

since the cursor to select key can be moved to direction of the indication key to desired to select in the shortest distance only by inclining the equipment to direction, the cursor to select key on the key arrangement screen can be moved to the arbitrary directions according to the inclination of equipment, and the desired indication key can be quickly selected by simple operation;

because it is comprised that, when selecting either of the plurality of indication keys from the cursor to select key by using the key arrangement screen arranged the plurality of indication keys assigned the different operations, the inclination angle detector detects inclination of the equipment and outputs the posture signal; the cursor to select key is made to move to direction which the equipment inclines based on the posture signal and select the indication key in which the cursor to select key is located.

Moreover, the operation equipment and the operation system of the present invention performs effects in that:

since the cursor moved to the indication key which adjoins is not performed further movement unless it returns equipment to a home position, the cursor can be certainly moved to the indication key which adjoins by making the equipment incline, and it can be stopped the cursor certainly to the adjoining indication key desired by inclining equipment two or more times even if having not got used to operation;

because it is comprised that, when selecting either of the plurality of indication keys from the cursor to select key by using the key arrangement screen arranged the plurality of indication keys assigned the different operations, the inclination of the equipment is detected by the inclination angle detector and outputs the posture signal, based on the posture signal; the inclination of arrangement direction of the indication key based on the posture signal is extracted; and the cursor is made to move one for the direction toward the indication key which adjoins direction of the extracted inclination when the extracted inclination is changed from less than to greater than or equal to the first threshold previously set.

Furthermore, the operation equipment and the operation system of the present invention performs effects in that:

the inclination of the direction for moving the cursor can be determined easily;

because it is comprised that while the rotation angle calculator computes the rotation angle of the X-axis and the Y-axis which are parallel to a main surface part and perpendicularly intersect mutually based on the posture signal from the inclination angle detector as the X-axis rotation angle and the Y-axis rotation angle, respectively; the posture vector how much inclined by being composition of the X-axis rotation angle and the Y-axis rotation angle is computed; and the inclination of the arrangement direction of the indication key is extracted by the calculated posture vector.

Furthermore, the operation equipment and the operation system of the present invention performs effects in that:

the cursor can be moved to the indication key that adjoins different direction from the arrangement direction of the indication key in one operation if the arrangement directions of the indication key are 2 directions;

because it is comprised that, when the arrangement directions of the indication key are of 2 directions, the respective 2 directions which is the arrangement direction of the indication key are extracted based on the posture signal; if both of the extracted 2 directions are changed from less than to greater than or equal to the first threshold, the cursor is moved to one to the extracted 2 directions, respectively.

Moreover, the operation equipment and the operation system of the present invention performs effects in that:

since the cursor can be moved certainly to the indication key which adjoins by performing the predetermined operation to the equipment, and it can be stop the cursor certainly to the adjoining indication key desired by inclining equipment two or more times even if having not got used to operation;

because it is comprised that, when selecting either of the plurality of indication keys by the cursor in the key arrangement screen arranged the plurality of indication keys assigned the different operations; the inclination angle detector detects the inclination angle of the equipment and outputs the posture signal; the operation detector detects the predetermined operation for the equipment based on the posture signal; the cursor controller moves the cursor one to the indication key adjoining the direction to which the equipment is inclined if the predetermined operation is detected by this operation detector.

Furthermore, the operation equipment and the operation system of the present invention performs effects in that:

the certain movement of the cursor to the adjoining indication key and execution of the operation assigned to the indication key can be performed alternatively by performing predetermined operation to the equipment if the predetermined operation is performed; and the physical input key prepared in the equipment is reducible;

because it is comprised that with extracting the inclination of arrangement direction of the indication key based on the posture signal, if the predetermined operation is detected, it moves the cursor one to the direction toward the indication key that adjoins direction of the extracted inclination when the extracted inclination is greater than or equal to the threshold previously set; if the extracted inclination is kept less than the threshold previously set, the operation of the indication key where the cursor is located is performed.

Moreover, the operation equipment and the operation system of the present invention performs effects in that:

while being able to select directly either of the plurality of indication keys arranged by first cursor move control according to the posture of equipment in a first operation screen which has relatively few the number of indication keys, the move control of the cursor which is suitable for a second operation screen with the second cursor move control to which cursor is moved in different logic from the first cursor move control is adopted in the second operation screen on which the number and layout of the indication key differ from each other as the first operation screen, and an operatively of cursor movement in each operation screen based on the inclination angle of the equipment can be raised;

because it is comprised that it is used properly either of: the first cursor move control which the inclination of equipment is detected by the inclination detector of the equipment with: outputting the posture signal, specifying either of the plurality of indication keys based on the posture signal according to an operation screen, and moving the cursor; the second cursor move control to which the cursor is moved in different logic from the first cursor move control based on the posture signal.

Furthermore, the operation equipment and the operation system of the present invention performs effects in that:

since it can be properly used according to an operation screen for the first cursor move control in which it can be selected directly either of the plurality of indication keys arranged on the operation screen according to the posture of the equipment and the second cursor move control which can make it move to arbitrary directions according to the inclination of equipment, it can be adopted that the move control of the cursor suitable for each operation screen, and the operational capacity of the cursor movement in each operation screen based on the inclination angle of the equipment can be raised;

because it is comprised that it is used properly either of the first cursor move control to which moves the cursor by detecting inclination of equipment from the inclination angle detector and outputting the posture signal with specifying either of the plurality of indication keys based on the posture signal according to an operation screen by moving cursor to direction which equipment inclines based on a posture signal and the second cursor move control which selects the indication key in which the cursor is located with moving the cursor to the inclined direction of the equipment based on the posture signal.

Furthermore, the operation equipment and the operation system of the present invention performs effects in that:

while it is able to select directly either of the plurality of arranged indication keys according to the posture of equipment in the operation screen, the cursor to select musical piece can be moved to arbitrary direction according to the inclination of equipment in the screen of musical piece map; this enables to adopt the move control of the cursor suitable for each screen, and the operational capacity of the cursor movement in each screen based on the inclination angle of the equipment can be raised;

because it is comprised that it outputs the posture signal by detecting the inclination of the equipment by the method of detecting inclination; it moves the cursor by selecting either of the plurality of the indication keys based on the posture signal in the operation screen arranged the plurality of indication keys in which each key is assigned the different operation; either of the plurality of indication keys is specified based on the posture signal in the screen of musical piece map unfolding the plurality of musical piece data is arranged; it moves the cursor to direction which the equipment inclines based on the posture signal and select the musical piece data located in the cursor to select musical piece.

Moreover, the operation equipment and the operation system of the present invention performs effects in that:

while being able to move the cursor to select key to direction of the indication key to select by first cursor move control in the shortest distance in the first operation screen which has relatively many number of the indication keys, it is able to be adopted the move control of the cursor which is suitable for the second operation screen by the second cursor move control to which cursor is moved in different logic from the first cursor move control in the second operation screen on which the number and layout of the indication key differ from the first operation screen, and the operational capacity of cursor movement in each operation screen based on the inclination angle of equipment can be raised;

because it is comprised that it is used properly either of: the first cursor move control, which the inclination of equipment is detected by the inclination angle detector and the posture signal is outputted with specifying either of the plurality of indication keys based on the posture signal according to the operation screen, and the cursor is moved by the inclination angle detector; the second cursor move control to which cursor is moved in different logic from the first cursor move control based on the posture signal.

Furthermore, the operation equipment and the operation system of the present invention performs effects in that:

it can be adopted the second cursor move control, which can move the cursor certainly to the indication key which adjoins by inclining the equipment in the second operation screen;

because it is comprised that it extracts the inclination of arrangement direction of the indication key based on the posture signal with moving the cursor to one for the direction toward the indication key which adjoins direction of the extracted inclination when the extracted inclination is changed from less than to greater than or equal to the first threshold previously set, as the second cursor move control.

Furthermore, the operation equipment and the operation system of the present invention performs effects in that:

it can be adopted the second cursor move control which can move the cursor certainly to the indication key which adjoins by performing the predetermined operation in the second operation screen;

because it is comprised that it moves the cursor one to the direction toward the indication key which adjoins direction to which the equipment is inclined when the predetermined operation is detected by the operation detector as the second cursor move control if the predetermined operation to the equipment is detected by the operation detector.

BRIEF DESCRIPTION OF THE DRAWINGS

FIG. 1 is a perspective diagram showing an appearance composition of the embodiment of operation equipment according to the present invention.

FIG. 2 is a block diagram showing a composition of the operation equipment shown in FIG. 1.

FIG. 3 is a diagram for explaining the operation equipment is in a using state shown in FIG. 1.

FIG. 4 is a view showing the example of an output of the inclination angle detection part shown in FIG. 2.

FIG. 5 is a diagram explaining the posture vector calculator in the coordinates conversion part shown in FIG. 2.

FIG. 6 is a waveform chart for explaining an operation detector "tap" in the detection part of operation shown in FIG. 2.

FIG. 7 is a waveform chart for explaining an operation detector "shake" in the detection part of operation shown in FIG. 2.

FIG. 8 is a view showing first example of a key arrangement screen memorized in the screen memory part shown in FIG. 2.

FIG. 9 is a view showing an example of a screen of musical piece map memorized in the screen memory part shown in FIG. 2.

FIG. 10 is a view showing second example of a key arrangement screen memorized in the screen memory part shown in FIG. 2.

FIG. 11 is a view showing third example of a key arrangement screen memorized in the screen memory part shown in FIG. 2.

FIG. 12 is a view showing fourth example of a key arrangement screen memorized in the screen memory part shown in FIG. 2.

FIG. 13 is a view showing an example of cell information memorized in the cell information memory part shown in FIG. 2.

FIG. 14 is a view showing first example of a conversion table corresponding to first key arrangement screen shown in FIG. 8.

FIG. 15 is a view showing second example of a conversion table corresponding to second key arrangement screen shown in the screen of musical piece map and FIG. 10, as shown in FIG. 9.

FIG. 16 is a view showing an example of threshold information memorized in the threshold information memory part shown in FIG. 2.

FIG. 17 is a flow chart for explaining move operation of a cursor in the first key arrangement screen in the embodiment of the operation equipment according to the present invention.

FIG. 18 is a view showing other examples in the first cell information memorized in the cell information memory part shown in FIG. 2.

FIG. 19 is a view showing a state of a current cell expanded by the cursor control part shown in FIG. 2.

FIG. 20 is a flow chart for explaining move operation of the cursor to select musical piece in the screen of musical piece map in the embodiment of the operation equipment according to the present invention.

FIG. 21 is a flow chart for explaining move operation of the cursor to select key in the second key arrangement screen in the embodiment of the operation equipment according to the present invention.

FIG. 22 is a flow chart for explaining move operation of the cursor in third key arrangement screen in the embodiment of the operation equipment according to the present invention.

FIG. 23 is a view showing other examples of the threshold information memorized in the threshold information memory part shown in FIG. 2.

FIG. 24 is a flow chart for explaining move operation of the cursor in fourth key arrangement screen in the embodiment of the operation equipment according to the present invention.

FIG. 25 is a block diagram showing the composition of the embodiment of the operation system according to the present invention.

DESCRIPTION OF THE PREFERRED EMBODIMENTS

Hereafter, an embodiment of the present invention is explained in detail based on a drawing.

FIG. 1 is a perspective diagram showing the appearance composition of the operation equipment as an embodiment according to the present invention; FIG. 2 is a block diagram showing the composition of the operation equipment shown in FIG. 1; FIG. 3 is a diagram for explaining a use state of the operation equipment shown in FIG. 1; FIG. 4 is a view showing the example of an output of an inclination angle detection part as shown in FIG. 2; FIG. 5 is a diagram explaining a posture vector calculator in a coordinates conversion part shown in FIG. 2; FIG. 6 is a wave form chart for explaining an operation detector of tap in the detection part of operation shown in FIG. 2; FIG. 7 is a wave form chart for explaining an operation detector of shake in the detection part of operation shown in FIG. 2; FIG. 8 is a view showing the first example of a key arrangement screen memorized in the screen memory part shown in FIG. 2; FIG. 9 is a view showing first example of the screen of musical piece map memorized in a screen memory part shown in FIG. 2; FIG. 10 is a view showing second example of the key arrangement screen memorized in the screen memory part as shown in FIG. 2; FIG. 11 is a view showing third example of the key arrangement screen memorized in the screen memory part shown in FIG. 2; FIG. 12 is a view showing fourth example of a key arrangement screen memorized in the screen memory part shown in FIG. 2; FIG. 13 is a view showing example of the cell information memorized in a cell information memory part shown in FIG. 2; FIG. 14 is a view showing first example of a conversion table corresponding to first key arrangement screen shown in FIG. 8; FIG. 15 is a view showing the second example of a conversion table corresponding to the screen of musical piece map showing in FIG. 9 and the second key arrangement screen shown in FIG. 10; FIG. 16 is a view showing an example of threshold information memorized in a threshold information memory part shown in FIG. 2.

If the operation equipment 1 of the embodiment is a portable device, such as a HDD player or the like which playbacks the musical piece data recorded on HDD which is a recording medium; as referred to FIG. 1, while display part 3 is formed in the main surface part of case 2 to which shapes almost rectangle, and operation key 4 is formed in the right side part of case 2; in case 2, as FIG. 2 is referred to, it is equipped with inclination angle detection part 6, AD conversion part 7, and coordinates conversion part 8, operation detection part 9, screen memory part 10, cell information memory part 11, conversion table memory part 12, threshold information memory part 13, display control part 14, cursor control part 15, central control part 16, database 17 and audio output part 18.

Display parts 3 is a display, such as a liquid crystal display (LCD) or the like, while various guidance information, such as playback time or the like, and bibliography data to playback, such as a title name of musical piece data and an artist name or the like, are displayed, various indication keys, such as selection of operation, adjustment of volume, reference of musical piece data, and playback directions of musical piece data or the like, are displayed. In addition, although it is comprised that the guidance information and the indication key are displayed on display part 3 on the same screen in the embodiment, it is possible to display the guidance information and the indication key on a separate display by preparing the other display, such as a liquid crystal display (LCD) or the like, in the main surface part of operation equipment 1.

Operation key 4 is what functions as the operation key which indicates an turned-on or turned-off of a power supply; and an execution key which indicates execution of the function which the user selects (the indication key); operation key 4 is arranged which can be operated with the thumb grasping operation equipment 1 with the right hand and turning up upper of the right side part of case 2, that is, the main surface part in which display part 3 is provided, shown in FIG. 3.

Inclination angle detection part 6 is an inclination sensor which uses acceleration sensors, for example: an electrostatic capacity type, a piezo resistance type, and a heat distribution detection type or the like, and it output the posture signal to AD conversion part 7 according to inclination of the X-axis and the Y-axis which are parallel and perpendicularly intersect mutually to the main surface part, that is, a display surface of a display part 3, and the Z-axis perpendicular to the main surface part, as referred to FIG. 1. In addition, in the embodiment, the X-axis is set as vertical direction of display part 3, and the Y-axis is set as right-and-left direction of display part 3, respectively.

As inclination angle detection part 6, the output voltage according to the inclination angle of the X-axis, the Y-axis and the Z-axis is obtained as the posture signal as shown in FIG. 4 if an electrostatic capacity type 3 axis acceleration sensor which detects the inclination of the X-axis, the Y-axis and the Z-axis (the Z-axis is set as an axis perpendicular to the main surface part as shown in FIG. 1) by making change of the distance between beams into an electrostatic capacity value as the fixed beam and the movable beam are chosen to electrode of a capacitor, respectively.

AD conversion part 7 converts the posture signal outputted by the inclination angle detection part 6 into a digital signal and outputs it to coordinates conversion part 8; the coordinates conversion part 8 computes each a rotation angle $\theta_x$ and a rotation angle $\theta_y$, which the X-axis and the Y-axis are the respective centers for operation equipment 1, based on the inputted posture signal. The rotation angle, the $\theta_x$ of rotation angle from the inclination angle of the X-axis and the Z-axis, the $\theta_y$ of rotation angle from the inclination angle of the Y-axis and the Z-axis, can be determined, respectively. Hereafter, rotation of operation equipment 1 centering on the X-axis is called rotation of pitch direction, and rotation of operation equipment 1 centering on the Y-axis is called rotation of roll direction. Moreover, the rotation angle $\theta_x$ and $\theta_y$ made into angle of 0 degree if the main surface part of case 2 cross at right angles to gravity direction; rotation of pitch direction which moves upper of display part 3 to bottom is considered as plus; rotation of pitch direction which moves lower of display part 3 to the bottom is considered as minus; rotation of roll direction which moves right of display part 3 to the bottom is considered as plus, and rotation of roll direction which moves left of the display part to the bottom is considered as minus. Moreover, coordinates conversion part 8 combines the computed rotation angle $\theta_x$ and $\theta_y$, as shown in FIG. 5, computes a posture vector R which are shown by an angle $\theta_a$ which shows a direction of operation equipment 1 inclined and length r which shows a size of the inclination angle of operation equipment 1, and outputs it to the cursor control part 15. In addition, calculation of posture vector R in coordinates conversion part 8 is performed for every sampling time in AD conversion part 7.

Operation detection part 9 detects the operation of "tap" and "shake" performed to operation equipment 1, and out puts a signal of detected operation that shows operation detected to cursor control part 15.

An example of the posture signal outputted from the inclination angle detection part 6 when the operation "tap" to the main surface part of operation equipment 1 is performed is shown in FIG. 6(a), and it turns out that change per time of the Z-axis is large. Thus, operation detection part 9 computes ((difference between the sample and a sample after 1 sample) *100) as a quantity of displacement by the output of the Z-axis in AD conversion part 7 for every sampling time for one sample. if less than five of the quantity of displacement computed by operation detection part 9 is plotted as "0" for a time series, as shown in FIG. 6(b); operation detection part 9 detects that the operation "tap" is performed with the value from which quantity serves as a momentary big inclination, shown as A in the FIG. 6(b), exceeding threshold ±alpha defined previously. In addition, operation detection part 9 is controlled not to detect the operation "tap" until a time Ta, which is previously set as attenuation time because the quantity of displacement is big in several times after the operation "tap" is detected. Moreover, although it composes detection of operation "tap" is based on the output of the Z-axis in the embodiment, notable changes are found in the output of the X-axis and/or Y-axis in case of tapping position of operation equipment 1; thus, it is possible to detect the operation "tap" based on the output of X-axis and/or Y-axis. Moreover, it is also detectable about the number of times of the operation "tap" by the number of times of detection. That is, since the posture signal in operation "tap" is generated only by a shock added to a case, distinction with the shock which is not intended is difficult; thus, for example, it is also considered the method for judging "tap" only the case where a posture signal is continuously detected twice or more at intervals of the time registered previously.

In FIG. 7(a), it is shown that an example of a posture signal outputted from the inclination angle detection part 6 when operation "shake" is performed to operation equipment 1; all of the X-axis, the Y-axis and the Z-axis are changed up and down at a designated intervals. Thus, operation detection part 9 computes ((difference between the sample and a sample after 4 samples) *100) as a quantity of displacement by the output of the X-axis in AD conversion part 7 for every sampling time for one sample. if it is plotted for time series, which less than five of the quantity of displacement computed by operation detection part 9 is as "0", and the value except "0" is not continued equal or more than 5 samples is also as "0", as shown in FIG. 7(b); operation detection part 9 detects that the operation "shake" is performed that it detects several time about changes of plus to minus and minus to plus within a time Tb, which is previously set and is need to detect the operation "shake", shown as beta in FIG. 7(b). Moreover, it is also detectable about the number of times of the operation "shake" by the number of times of detection and a detection of direction of the operation "shake" by the posture signal at a point of detection. Moreover, in the embodiment, although it composes to detect the operation "shake" by the output of X-axis, it is possible to detect the operation "tap" by the output of Y-axis and/or Z-axis.

A screen memory part 10 is a method of memorizing which memorize the operation screen(s) which are arranged the guidance information display domain where various guidance information is displayed, the plurality of indication keys assigned the different operations and the musical piece map for searching musical piece data; it memorizes a screen which performs operations relevant to playback of the musical piece data, a screen which perform in adjustment of volume and a screen carry out reference of musical piece data. In addition, as screens where a comparatively few numbers of indication keys are arranged, first key arrangement screen 31 where five the indication keys Km (m=1–5) are arranged as shown in FIG. 8(a), and first key arrangement screen 32 where two indication keys Km (m=1–2) are arranged as shown in FIG. 8(b) are to be memorized in screen memory part 10. Moreover, as the screen where the musical piece map is arranged, as shown in FIG. 9, a screen of musical piece map 33 which is arranged musical piece map 40 on which the musical piece data memorized in database 17 is unfolded on a plane based on two evaluation criteria (for example, "quiet-intense" and "bright-dark") is to be memorized in the screen memory part 10. Furthermore, as a screen where comparatively many numbers of indication keys are arranged, as shown in FIG. 10, second key arrangement screen 34 which is arranged 25 indication keys Km (m=1–25) is memorized in screen memory part 10.

Furthermore, screen memory part 10 is memorized: third key arrangement screen 35a, which is a screen where the plurality of indication keys Km (m=1–10) are arranged by X-axis direction and is, for example, a screen performing volume control or the like, as shown in FIG. 11(a); third key arrangement screen 35b, which is a screen where the plurality of indication keys Km (m=1–25) are arranged by the X-axis and Y-axis direction and is, for example, a screen performing to input characters or the like, as shown in FIG. 11(b); fourth key arrangement screen 36, which is a screen where the plurality of indication keys Km (m=1–5) are arranged by Y-axis direction and is, for example, a screen performing menu selection. In addition, the size of the various screens memorized in screen memory part 10 does not need to be the same as thereof the display domain of display part 3; if the various screens memorized in the screen memory part 10 is larger than the display domain of display part 3, it is partially displayed on display part 3, and display area is moved by scrolling.

Cell information memory part 11 is the method of memorizing by which it is memorized as cell information comprising of the plurality of cells (domain), and first cell information properly used by the operation screen memorized in the screen memory part 10 and the second cell information are memorized.

The first cell information is used for first key arrangement screen 31 and 32 memorized in screen memory part 10; the first cell information, as referred to FIG. 13(*a*), is comprising of the plurality of cells divided based on angle $\theta_a$ and length r in posture vector R computed in AD conversion part 7, and it comprises one cell can be specified as the current cell based on posture vector R. In addition, numbers of the cell in the first cell information are equipped more than the maximum number of the indication keys that in a corresponding operation screen arranged. Moreover, an example shown in FIG. 13(*a*) is first cell information which is comprised of eight cells S (m, n: m=1, 2, 3, 4; n=1, 2) in which: angle $\theta_a$ is divided into m=4 every 90 degrees, and length r is divided into n=2.

The second cell information is used for the screen of musical piece map 33 and second key arrangement screen 34 which are memorized in the screen memory part 10; the second cell information, as referred to FIG. 13(*b*), it is comprised of the plurality of cells divided based on the length r of posture vector R computed in the coordinates conversion part 8, and it composes that one cell can be specified as the current cell based on posture vector R. In addition, the number of the cell in the first cell information is arbitrary, and the second cell information which is comprised of three cells Sn (n=0, 1, 2) and is divided according to length r is shown in FIG. 13 (*b*).

Conversion table memory part 12 is a method of memorizing first conversion table which associates each cell of the first cell information and indication key memorized in the cell information memory part 11 and second conversion table which associates each cell of the second cell information and amount of movements and speed of the cursor.

As the first conversion table, they are used for first key arrangement screen 31, as shown in FIG. 14(*a*), which associates indication key Km (m=1–5) shown in FIG. 8(*a*) with eight cells Sm,n in the first cell information shown in FIG. 13(*a*) and for first key arrangement screen 32, as shown in FIG. 14 (*b*), which associate the indication key Km (m=1–2) with the eight cells Sm,n in the first cell information shown in FIG. 13 (*a*); the first conversion table is prepared for every key arrangement screen, which the arrangement of the indication key Km differs, respectively. In addition, if there are the plurality of the first key arrangement screen of the arrangement of the indication key Km are the same, it is needless to say that the first conversion table can be shared.

The second conversion table shown in FIG. 15 is associated the amount of movements Ln (n=0, 1, 2) and speed An (n=0, 1, 2) with three cells Sm in the second cell information shown in FIG. 13(*b*), respectively. In addition, amount of movements L0 and speed A0 of cell information which are associated with the most inside cell S0 in the second cell information are "0"; it is set that the amount of movements become larger and speed become quicker if posture vector R is long, which the inclination of equipment is large; the amount of movements Ln serves as a relation of L0<L1<L2, and speed An serves as a relation of A0<A1<A2; In addition, the amount Ln of movements shows the amount of movements of the cursor per time and is signified the same information for speed An.

Threshold information memory part 13, as referred to FIG. 16, is a method of memorizing, which the length r of posture vector R computed in AD conversion part 7, that is, threshold T0 of inclination angle of operation equipment 1 is memorized as threshold.

While display control part 14 reads either of the various operation screens memorized in screen memory part 10 based on the order of central control part 16 and displays it on display part 3, it also notifies the operation assigned to the indication key arranged on the operation screen displayed on display part 3 to cursor control part 15. Moreover, display control part 14 notifies to cursor control part 15 that an operation screen specification information for specifying the operation screen displayed on display part 3 if displaying the first key arrangement screen 31 and 32, the screen of musical piece map 33, and second key arrangement screen 34 on display part 3 and a key arrangement information which is direction of the indication key Km arranged, that is, move direction of the cursor if displaying third key arrangement screen 35*a* and 35*b* and fourth key arrangement screen 36 on display part 3, respectively. Furthermore, the display control part 14 unfolds each musical piece data as figures, such as a point or the like, on the musical piece map 40 arranged by the screen of musical piece map 33 based on an evaluating point of the musical piece data memorized in database 17, if displaying the screen of musical piece map 33 on display part 3. In addition, display control part 14 reads the bibliography data, such as a title name of the musical piece data to playback, an artist name or the like, from database 17 based on the directions from central control part 16, and displays it on a guidance information display domain if the guidance information display domain is arranged in the operation screen displayed on display part 3.

Cursor control part 15 is performed: a move control of the cursor selecting either of the plurality of indication keys Km arranged on first key arrangement screen 31, 32 displayed on display part 3; a move control of the cursor which shows domain(s) on the screen of musical piece map 33 (hereafter, the cursor on the screen of musical piece map 33 is called a cursor to select musical piece 37); a move control of the cursor which selects either of the plurality of indication keys Km arranged on the second key arrangement screen 34 displayed on display part 3 (hereafter, the cursor on the second key arrangement screen 34 is called a cursor to select key 38); a move control of the cursor which selects either of the plurality of indication keys Km arranged on third key arrangement screen 35*a* and 35*b*; and a move control of the cursor which selects either of the plurality of indication keys Km arranged on fourth key arrangement screen 36. In addition, the cursor is what shows selected by: changing colors of candidate for selection, reverse processing, and displaying underline, for the target of the selection if the target of selection, such as information, a domain and a indication key, are selected; and the target in which cursor is located is selected by moving the cursor.

If first key arrangement screen 31 and 32 is displayed on display part 3: cursor control part 15 specifies a cell (hereafter, the cell is called as the current cell) corresponding to posture vector R inputted from the coordinates conversion part 8 based on the first cell information memorized in cell information memory part 11; either of the first conversion tables memorized in conversion table memory part 12 based on the operation screen specification information notified from display control part 14 is specified; the indication key related with the current cell specified by using the specified first conversion table is specified; the cursor is moved to the specified indication key Km. Moreover, cursor control part 15 notifies the operation assigned to the indication key in which cursor is located to central control part 16 if operation key 4 is pressed-down. In addition, the state where the indication key K1 is selected is shown in FIG. 8(*a*), and the state where the indication key K1 is selected as FIG. 8(*b*), respectively.

If the screen of musical piece map 33 or second key arrangement screen 34 is displayed on display part 3: the cursor control part 15 specifies a cell (hereafter, the cell is called as a current) corresponding to posture vector R inputted from coordinates conversion part 8 based on the second cell information memorized in cell information memory part 11; it specifies the amount of movements and speed related with the current cell, which is specified by using the second conversion table; cursor to select musical piece 37 and cursor to select key 38 are moved by the amount of movements and speed, which are specified to direction of posture vector R. In addition, if operation equipment 1 is kept almost in a level, and a most inside cell S0 of the cell information is specified as the current cell by posture vector R, it is controlled the movement of the cursor to select musical piece 36 is not performed, as the amount of movements L0 and speed A0 related with the cell S0 are "0". Moreover, if the operation key 4 is pressed-down, cursor control part 15 notifies the operation assigned to the indication key Km in which cursor to select key 38 is located to central control part 16 in the second key arrangement screen 34, with notifying the musical piece data included in cursor to select musical piece 37 to central control part 16 in the screen of musical piece map 33. In addition, although the state where indication key K23 is selected is shown to FIG. 10 by cursor to select key 38, and cursor to select key 38 is displayed as a point, it can be made cursor to select key 38 not to display.

if third key arrangement screen 35*a* and 35*b* is displayed on display part 3, cursor control part 15 controls the movement of cursor by extracting a component of cursor move direction of posture vector R inputted from coordinates conversion part 8 based on the key arrangement information from display control part 14 and by comparing with the threshold information memorized in the threshold information memory part 13. Moreover, the cursor control part 15 notifies the operation assigned to the indication key Km in which cursor is located to central control part 16 in third key arrangement screen 35*a* and 35*b* if operation key 4 is pressed-down.

If fourth key arrangement screen 36 is displayed on display part 3, cursor control part 15 extracts the component of cursor move direction from posture vector R inputted from coordinates conversion part 8 based on the key arrangement information from display control part 14, and the extracted component of cursor move direction is memorized more than at least a time required for detecting the operation performed to operation equipment 1 (time Tb required in order to detect operation "shake"). Moreover, if an incoming signal is inputted from operation detection part 9, cursor control part 15 judges the inclination to the cursor movement of the operation equipment 1 before the operation to operation equipment 1 by judging the component of the cursor movement for posture vector R before a predetermined time from the time of the inputted incoming signal of operation (before one sample time required when inputting the signal that shows the operation "tap"; the time Tb required in order to detect the operation "shake" when inputting the signal that shows the operation "shake") is less than threshold T0 memorized in threshold information memory part 13. Furthermore, if the component of cursor move direction in posture vector R before the operation is performed to operation equipment 1 is less than threshold T0, cursor control part 15 notifies the operation assigned to the indication key Km in which the cursor is located to central control part 16 in the first key arrangement screen 31, the second key arrangement screen 34, and the third key arrangement screen 35*a* and 35*b*; if the component of cursor move direction in posture vector R before the operation is performed to operation equipment 1 is greater than or equal to threshold T0, the cursor is moved to one for the direction of the component of the cursor move direction in posture vector R.

While central control part 16 performs playback of the musical piece data notified from cursor control part 15 by controlling audio output part 18, it performs the operation notified from cursor control part 15 by controlling display control part 14 and audio output part 18. Moreover, it controls a control to turn on a power supply if the operation key 4 is pressed-down in the state of the power supply cutting, and it controls a control to cut the power supply if operation key 4 is pressed-down more time previously set in the state of the power supply turned on. In addition, the control to cut the power supply can be performed by the indication key in which preparing the indication key, which an operation to cut the power supply is assigned in either of the operation screens.

Databases 17 is a method of recording, such as HDD or the like, while the musical piece data inputted from the musical piece data input terminal (not shown in the figure) are recorded, the bibliography data, such as; the title name of each musical piece data and the artist name, and the evaluating point of having evaluated musical piece data about at least two evaluation criteria, are recorded, respectively.

Audio output part 18 is an audio player which playbacks the musical piece data recorded on database 17 based on the order from central control part 16 and is outputted audio signal(s) from sound output terminal(s) (not shown in the figure) to sound output device(s), such as a head phone or the like (not shown in the figure).

Then, move operation of the cursor in first key arrangement screen 31 and 32 are explained in detail with referencing to FIG. 17.

FIG. 17 is a flow chart for explaining the move operation of the cursor in the first key arrangement screen in the embodiment of the operation equipment according to the present invention.

If display control part 14 reads first key arrangement screen 31 and 32 from screen memory part 10 and displays it on display part 3 based on an order of central control part 16 (step A1), it notifies the operation screen specification information which specifies first key arrangement screen 31 and 32 displayed on display part 3 to cursor control part 15 (step A2).

Coordinates conversion part 8 computes the respective rotation angle $\theta_x$ of the X-axis and $\theta_y$ of the Y-axis based on the posture signal outputted from inclination angle detection part 6 and converted into the digital signal by AD conversion part 7 (step A3); and it computes posture vector R which is composed of angle $\theta_a$ which shows the direction the operation equipment 1 inclined and length r which shows the size of the inclination angle of operation equipment 1 by being composition of the computed rotation angle $\theta_x$ and $\theta_y$ (step A4).

Then, while cursor control part 15 specifies the current cell corresponding to posture vector R inputted from coordinates conversion part 8 based on the first cell information memorized in cell information memory part 11 (step A5); either of the first conversion table memorized in conversion table memory part 12 based on the operation screen specification information notified from display control part 14 is specified; the indication key Km related with the current cell specified by using the first specified conversion table is specified (step A6); the cursor is moved to the specified indication key Km (step A7). In FIG. 14(a), it is shown that the state where a cell S1, 2 in the first cell information is specified as the current cell by posture vector R computed in coordinates conversion part 8: in a case of the first key arrangement screen 31, the cell S1, 2 of the current cell is converted into the indication key K1 by the first conversion table as shown in FIG. 15(a), and the cursor is moved to the indication key K1 as shown in FIG. 8(a); in a case of the first key arrangement screen 32, the cell S1, 2 of the current cell is converted into the indication key K1 by the first conversion table shown in FIG. 15(b), and the cursor is moved to the indication key K1 as shown in FIG. 8(b).

Then, cursor control part 15 judges whether the operation key 4 is pressed-down (step A8), and the operation assigned to the indication key in which cursor is located is notified to central control part 16 if operation key 4 is pressed-down; central control part 16 performs the operation notified from cursor control part 15 by controlling display control part 14 and audio output part 18 (step A9), and the move operation of the cursor in the first key arrangement screen 31 and 32 is finished.

Moreover, if the operation key 4 is not pressed-down at step A8, it returns to step A3, and coordinates conversion part 8 is outputted from inclination angle detection part 6, and it computes the rotation angle $\theta_x$ of the X-axis and $\theta_y$ of the Y-axis based on the posture signal converted into the digital signal by AD conversion part 7, respectively.

Then, other examples in the first cell information memorized in cell information memory part shown in FIG. 2 are explained in detail as refer to FIG. 18.

FIG. 18 is a figure showing other examples of the cell information memorized in the cell information memory part shown in FIG. 2.

As the cell information which cell information memory part 11 is made to memorize, it can be comprised of the plurality of divided cells based on the rotation angle $\theta_x$ of the X-axis and the rotation angle $\theta_y$ of the Y-axis shown in FIG. 18; in this case, what is necessary is just to output the rotation angle $\theta_x$ and $\theta_y$ computed in coordinates conversion part 8 to cursor control part 15, respectively; thus, it becomes unnecessary to compute posture vector R in coordinates conversion part 8. In addition, an example shown in FIG. 18 is a cell information which is comprised of eight cells S (n, m: m=1, 2, 3, 4; n=1, 2) in which Y-axis rotation angle $\theta_y$ is divided into m=4, and the X-axis rotation angle $\theta_x$ is divided into m=2.

Then, it is explained in detail that an example that has a characteristic of hysteresis to movement of the cursor between indication keys in the first key arrangement screen 31, as refer to FIG. 19.

FIG. 19 is a figure showing the state of the current cell expanded by the cursor control part shown in FIG. 2.

Since it comprises that the indication key which cursor moves (positions) is determined by the current cell specified by posture vector R in the move operation of the cursor for the first key arrangement screen 31 described above, in the first cell information, when posture vector R is located on the almost boundary line of the current cell and the adjoining cell, the cell specified as the current cell will be changed by slight blur, and there is a possibility that the cursor is coming and going between adjoining indication keys. Thus, the characteristic of hysteresis is given to the movement of the cursor between the adjoining indication keys, and it is possible to prevent coming and going for the cursor between the adjoining indication keys by a blur of slight inclination.

In order to give the characteristic of hysteresis to the movement of the cursor between the adjoining indication keys, cursor control part 15 makes the current cell specified by posture vector R expand to direction of the adjoining cell in the first cell information, as shown in FIG. 19(a) and (b). In FIG. 19(a), it is shown that the cell S1, 2, which the cursor control part 15 specifies as the current cell specified by posture vector R, is expanded to direction of adjoining cell 1, 1, cell 2, 2 and cell 4, 2. The cell 4, 2 is specified as the current cell by cursor control part 15 in case posture vector R changes displacement into a state which shows in FIG. 19(b) from a state shown in FIG. 19(a), and the cell S4, 2, which is the current cell, is expanded to direction of the adjoining cell 1, 2, cell 3, 2 and cell 4, 1 as shown in FIG. 19(c). Therefore, the boundary where the current cell changes from the state (the state where cell 4, 2 is specified as the current cell) as shown in FIG. 19(c) to the cell S1, 2 is set as a different position (position which not able to change easily) as the boundary where the current cell changes from the cell 1, 2, to cell 4, 2; it can prevent that the cursor coming and going between the adjoining indication keys by the blur of the inclination because the slight blur of the inclination is not specified as the current cell.

Then, it is explained in detail that the move operation of the cursor to select musical piece in the screen of musical piece map 33 as refer to FIG. 20.

FIG. 20 is a flow chart for explaining the move operation of the cursor to select musical piece in the screen of musical piece map in the embodiment of the operation equipment according to the present invention.

If display control part 14 reads the screen of musical piece map 33 from screen memory part 10 and displays it on display part 3 based on the control of central control part 16 (step B1), it will notify the operation screen specification information which specifies the screen of musical piece map 33 displayed on display part 3 to cursor control part 15 (step B2).

Then, coordinates conversion part 8 compute the respective rotation angle $\theta_x$ of the X-axis and $\theta_y$ of the Y-axis based on the posture signal outputted from inclination angle detection part 6 and converted into the digital signal by AD conversion part 7 (step B3); it is computed that posture vector R which is shown by: the angle $\theta_a$ showing to the direction operation equipment 1 is inclined; and length r showing the size of the inclination angle of operation equipment 1 by being composition of the computed rotation angle $\theta_x$ and $\theta_y$ (step B4).

Then, cursor control part 15 specifies the current cell corresponding to posture vector R inputted from the coordinates conversion part 8 based on the second cell information memorized in cell information memory part 11 (step B5); it is specified that the amount of movements and speed, which are related with the current cell specified by using the second conversion table memorized in the conversion table memory part 12 (step B6); the cursor to select musical piece 37 is made to move by the specified amount of movements and speed toward the direction of posture vector R (step B7). In addition, the state, where the cell S2 of the second cell information is specified as the current cell by posture vector R computed in coordinates conversion part 8, is shown in FIG. 13(b), and the amount of movements and speed of cursor to select musical piece 37 are specified as L2 and A2, respectively, on the second conversion table as shown in FIG. 15 in this case.

Then, cursor control part 15 judges whether the operation key 4 is pressed-down (step B8); if operation key 4 is pressed-down, the musical piece data included in cursor to select musical piece 37 is notified to central control part 16; central control part 16 playbacks the musical piece data notified from cursor control part 15 is performed by controlling audio output part 18 (step B9); it is finished that the move operation of the cursor to select musical piece 37 in the screen of musical piece map 33.

Moreover, if operation key 4 is not pressed-down at step B8, it returns to step B3, and coordinates conversion part 8 is outputted from the inclination angle detection part 6, and it computes the rotation angle $\theta_x$ of the X-axis and $\theta_y$ of the Y-axis based on the posture signal converted into the digital signal by AD conversion part 7, respectively.

Then, it is explained in detail that the move operation of the cursor to select key in the second key arrangement screen 34 as refers to FIG. 21.

FIG. 21 is a flow chart for explaining the move operation of the cursor to select key in the second key arrangement screen in the embodiment of the operation equipment according to the present invention.

If display control part 14 reads second key arrangement screen 34 from screen memory part 10 and displays it on display part 3 based on control of central control part 16 (step C1), it notifies the operation screen specification information which specifies second key arrangement screen 34 displayed on display part 3 to cursor control part 15 (step C2).

Coordinates conversion part 8 computes the respective rotation angle $\theta_x$ of the X-axis and $\theta_y$ of the Y-axis based on the posture signal outputted from inclination angle detection part 6 and converted into the digital signal by AD conversion part 7 (step C3), and it computes posture vector R which is composed of angle $\theta_a$ which shows the direction the operation equipment 1 inclined and length r which shows the size of the inclination angle of operation equipment 1 by being composition of computed rotation angle $\theta_x$ and $\theta_y$ (step C4).

Then, cursor control part 15 specifies the current cell corresponding to posture vector R inputted from coordinates conversion part 8 based on the second cell information memorized in cell information memory part 11 (step C5); the amount of movements and speed, which are related with the current cell specified by using the second conversion table memorized in conversion table memory part 12, are specified (step C6); The cursor to select key 38 is moved at the amount of movements and speed, which are specified as the direction of posture vector R (step C7); the indication key Km in which cursor to select key 38 is located is selected (step C8). In addition, in second key arrangement screen 34, each indication key domain 39 is set to the corresponding indication key Km, and indication key domain 39 are set to adjoin mutually. Cursor to select key 38 is to be located either of indication key domain 39 corresponding to the indication key Km, and the indication key Km corresponding indication key domain 39 located in cursor to select key 38 is to be selected. Therefore, as shown in FIG. 10, in order to shift from the state where the indication key K23 is selected by the cursor to select key 38 to the state where the indication key K5 is to be selected, by inclining operation equipment 1 to direction from the indication key K23 to the indication key K5 as shown in FIG. 10 by an arrow, cursor to select key 38 is able to move a straight line toward to indication key K5 from indication key K23 in the shortest distance, it becomes possible to select indication key K5 for a short time.

Then, cursor control part 15 judges whether the operation key 4 is pressed-down (step C9); if operation key 4 is pressed-down, the operation assigned to the indication key Km selected by cursor to select key 38 is notified to central control part 16; central control part 16 performs the operation notified from cursor control part 15 by controlling display control part 14 and audio output part 18 (step C10); it is finished that the move operation of cursor to select key 38 in second key arrangement screen 34.

Moreover, if operation key 4 is not pressed-down at step C9, it returns to step C3; coordinates conversion part 8 is outputted from inclination angle detection part 6, and it computes the rotation angle $\theta_x$ of the X-axis and $\theta_y$ of the Y-axis, respectively, based on the posture signal converted into the digital signal by AD conversion part 7.

Then, it is explained in detail that cursor move operation in third key arrangement screen 35a and 35b, as refer to FIG. 22.

FIG. 22 is a flow chart for explaining the move operation of the cursor in third key arrangement screen in the embodiment of the operation equipment according to the present invention.

If display control part 14 reads third key arrangement screen 35a or 35b from screen memory part 10 and displays it on display part 3 based on the control of the central control part 16 (step D1), it notifies the key arrangement information on third key arrangement screen 35a and 35b displayed on display part 3 to cursor control part 15 (step D2).

Then, coordinates conversion part 8 computes the respective rotation angle $\theta_x$ of the X-axis and $\theta_y$ of the Y-axis based on the posture signal outputted from inclination angle detection part 6 and converted into the digital signal by AD conversion part 7 (step D3), and it computes posture vector R which is composed of angle $\theta_a$ which shows the direction the operation equipment 1 inclined and length r which shows the size of the inclination angle of operation equipment 1 by being composition of the computed rotation angle $\theta_x$ and $\theta_y$ (step D4).

Then, cursor control part 15 extracts the component of cursor move direction from posture vector R inputted from coordinates conversion part 8 based on the key arrangement information from display control part 14 (step D5).

As for third key arrangement screen 35a shown in FIG. 11(a), display control part 14 outputs the key arrangement information that shows X-axis direction to cursor control part 15 because the indication key Km is arranged along with the X-axis.

Moreover, in case of third key arrangement screen 35b shown in FIG. 11(b), since the indication key Km is arranged along with the X-axis and the Y-axis, display control part 14 outputs the key arrangement information which shows X-axis direction and Y-axis direction to cursor control part 15, and cursor control part 15 extracts the component Rx of posture vector R in X-axis direction, and the component Ry of posture vector R in Y-axis direction, as shown in FIG. 11(b).

Then, cursor control part 15 judges whether or not the component of posture vector R in the cursor move direction is less than threshold T0 memorized in threshold information memory part 13 (step D6). It is judged whether it is the state, which the component of posture vector R in the cursor move direction becomes less than threshold T0 by step D3-step D6 as shown in FIG. 16(a), that is, the operation equipment is kept at a horizontally near state and the inclination angle is in the state below threshold T0 (hereafter it is called a home position).

If the component of posture vector R in the cursor move direction memorized in threshold information memory part 13 at step D6 is not less than threshold T0, namely, if operation equipment 1 is not kept at the home position, cursor control part 15 judges whether operation key 4 is pressed-down (step D7): if operation key 4 is not pressed-down, it returns to step D3; if operation key 4 is pressed-down, the operation assigned to the indication key Km selected by the cursor is notified to central control part 16, and central control part 16 performs the operation notified from cursor control part 15 by controlling display control part 14 and audio output part 18 (step D8); it is finished the move operation of the cursor.

If the component of posture vector R in the cursor move direction memorized in threshold information memory part 13 at step D6 is less than threshold T0, namely, if operation equipment 1 is kept at the home position, coordinates conversion part 8 computes the respective rotation angle $\theta_x$ of the X-axis and $\theta_y$ of the Y-axis based on the posture signal outputted from inclination angle detection part 6 and converted into the digital signal by AD conversion part 7 (step D9), and it computes posture vector R which is composed of angle $\theta_a$ which shows the direction the operation equipment 1 inclined and length r which shows the size of the inclination angle of operation equipment 1 by being composition of the computed rotation angle $\theta_x$ and $\theta_y$ (step D10).

Then, cursor control part 15 extracts the component of the cursor move direction from posture vector R inputted from coordinates conversion part 8 based on the key arrangement information from display control part 14 (step D11); it judges whether the component of posture vector R in cursor move direction memorized in threshold information memory part 13 is more than or equal to threshold T0 or not (step D12); it is to be judged whether it is or is not in the state, which the component of posture vector R in the cursor move direction becomes more than or equal to threshold T0 by step D9-step D12 as shown in FIG. 16(b), and the state, which operation equipment 1 is inclined to the cursor move direction and the inclination angle becomes equal to or more than threshold T0.

If the component of posture vector R in the cursor move direction memorized in the threshold information memory part 13 at step D12 is not more than or equal to threshold T0, namely, if operation equipment 1 is kept at the home position, cursor control part 15 judges whether the operation key 4 is pressed-down (step D13) or not: if operation key 4 is not pressed-down, it returns to step D9; if operation key 4 is pressed-down the operation assigned to the indication key Km selected by cursor is notified to central control part 16; central control part 16 performs the operation notified from cursor control part 15 by controlling display control part 14 and audio output part 18 (step D14); it is finished the move operation of the cursor.

If the component of posture vector R in the cursor move direction is greater than or equal to threshold T0 memorized in threshold information memory part 13 at step D12, (that is, if operation equipment 1 become the state, where it is inclined to the cursor move direction more than a predetermined quantity), cursor control part 15 moves the cursor one to the direction of the component of posture vector R in the cursor move direction (step D15); and it returns to step D3.

Thereby, in third key arrangement screen 35a to which the cursor is located in the indication key K7 as shown in FIG. 11(a), by inclining operation equipment 1 greater than or equal to T0 toward the direction to move cursor (either of the X-axis direction) from the home position, the cursor is to be moved only one to either indication key K6 or indication key K8, which they adjoin right or left. After moving the cursor to indication key K6 or indication key K8, because further movement of cursor is not performed unless operation equipment 1 is once returned to a home position, it becomes possible to move certainly the cursor to indication key K6 or indication key K8, which adjoins right or left from indication key K7.

Moreover, in third key arrangement screen 35b to which the cursor is located in indication key K18 as shown in FIG. 11 (b), by inclining operation equipment 1 greater than or equal to threshold T0 to the direction to move the cursor (an X-axis direction gap or Y-axis direction) from the home position, the cursor is to be moved only one to either indication key K17 or indication key K19, which the cursor adjoins right or left, or to either indication key K13 or indication key K13 which the cursor adjoins up and down. In addition, if there are two cursor move direction in this way, it is mutually controlled independently; for example, if it is changed from a state where both component Rx of posture vector R in X-axis direction and component Ry of posture vector R in Y-axis direction is less than threshold T0 as shown in FIG. 16(a) to a state where both component Rx of posture vector R in X-axis direction and component Ry of posture vector R in Y-axis direction is greater than or equal to threshold T0 as shown in FIG. 16(b), the cursor is moved one to the direction of the component Rx of posture vector R in X-axis direction and is moved one to the direction of the component Ry of posture vector R in Y-axis direction, respectively. Therefore, the cursor can be moved to indication key K12, indication key K14, indication key K22 or indication key K24, which adjoins diagonal from indication key K18 in one operation by one operation of inclining operation equipment 1 from the home position to a diagonal direction to move cursor with the respective inclination angle of X-axis direction and Y-axis direction becoming greater than or equal to threshold T0. After moving the cursor to indication key Km, which adjoins indication key K18 in four-directions with diagonal directions, since further movement of cursor is not performed unless operation equipment 1 is once returned to the home position, it becomes possible to move the cursor certainly to indication key Km, which adjoins indication key K18 in four-directions with diagonal directions.

Then, the other embodiment, which the control cursor movement in third key arrangement screen 35a and 35b by using two thresholds, is explained in detail, as refer to FIG. 23.

FIG. 23 is a view showing other examples of the threshold information memorized in the threshold information memory part as shown in FIG. 2.

In the other embodiment which controls the cursor movement by using two thresholds, as refer to FIG. 23, it composes that: length r of posture vector R computed by AD conversion part 7 in threshold information memory part 13, that is, threshold T0 of the inclination angle of operation equipment 1 and threshold T1 (threshold T0>threshold T1), are made to memorize; in the step D6, cursor control part 15 judge whether the component of posture vector R in the cursor move direction is less than threshold T1 memorized in threshold information memory part 13.

Thereby, for the movement of cursor to the adjoining indication key Km, the state where operation equipment 1 is kept less than threshold T1 is the home position as shown in FIG. 23(a), and the movement of cursor is performed if operation equipment 1 is inclined to the cursor move direction greater than or equal to T0 from the home position as shown in FIG. 23(b). Therefore, it can prevent the operation equipment 1 changing repeatedly between the home position and the states inclined greater than or equal to T0 and the cursor moving non-intentionally by a vibration in the state where operation equipment 1 is inclined greater than or equal to T0 toward the cursor move direction.

Then, it is explained in detail that the cursor move operation in fourth key arrangement screen 36 as refer to FIG. 24.

FIG. 24 is a flow chart for explaining the move operation of the cursor in the fourth key arrangement screen in the embodiment of the operation equipment according to the present invention.

If display control part 14 reads fourth key arrangement screen 36 from screen memory part 10 and displays it on display part 3 based on control of central control part 16 (step E1), it notifies the key arrangement information on fourth key arrangement screen 36 displayed on display part 3 to cursor control part 15 (step E2).

Then, coordinates conversion part 8 computes the respective rotation angle $\theta_x$ of the X-axis and $\theta_y$ of the Y-axis based on the posture signal outputted from the inclination angle detection part 6 and converted into the digital signal by AD conversion part 7 (step E3), and it computes posture vector R which is composed of angle $\theta_a$ which shows the direction the operation equipment 1 inclined and length r which shows the size of the inclination angle of operation equipment 1 by being composition of the computed rotation angle $\theta_x$ and $\theta_y$ (step E4).

Then, cursor control part 15 extracts the component of the cursor move direction from posture vector R inputted from coordinates conversion part 8 based on the key arrangement information from display control part 14 (step E5). In a case of fourth key arrangement screen 36 as shown in FIG. 12, since the indication key Km is arranged along with the Y-axis, display control part 14 outputs the key arrangement information which shows Y-axis direction to cursor control part 15, and cursor control part 15 extracts component Ry of posture vector R in Y-axis direction as shown in FIG. 16.

Then, cursor control part 15 judges whether the signal of detected operation is inputted from operation detection part 9 (step E6), and it returns to step E3 if the signal of detected operation is not inputted from operation detection part 9.

If the signal of detected operation is inputted from operation detection part 9 at step E6, cursor control part 15 judges whether or not the component of the cursor move direction in posture vector R before predetermined time of the input for the signal of detected operation is less than threshold T0 memorized in threshold information memory part 13 (step E7). Namely, when operation of "tap" and "shake" is performed to operation equipment 1 in step E7, it is judged whether or not that operation equipment 1 becomes the state, which the component of the cursor move direction in posture vector R become less than threshold T0 as shown in FIG. 16(a), that is, operation equipment 1 is kept at a horizontally near state in cursor move direction, and the inclination angle is in the state less than threshold T0 (hereafter, it is called the home position).

If the component of the cursor move direction in posture vector R is less than threshold T0 memorized in threshold information memory part 13 at step E7, namely, if operation equipment 1 is kept at the home position, cursor control part 15 notifies the operation assigned to the indication key Km, which is selected by the cursor, to central control part 16; central control part 16 is performed the operation notified from cursor control part 15 by controlling display control part 14 and audio output part 18 (step E8); it is finished the move operation of the cursor.

Thereby, the operation assigned to indication key Km, which is selected by the cursor, can be performed by performing the operation of "tap" or "shake" to operation equipment 1 in the state where operation equipment 1 is kept at the home position.

If the component of the cursor move direction in posture vector R memorized in threshold information memory part 13 is not less than threshold T0 at step E7, namely, if operation equipment 1 is not kept at the home position as shown in FIG. 16(b), cursor control part 15 moves the cursor one to the direction of a component of domain arrangement direction in posture vector R (step E9); and it returns to step E3.

Thereby, in fourth key arrangement screen 36 on which the cursor is located in indication key K3 as shown in FIG. 12, the cursor is to be moved only one to either indication key K2 or indication key K4 which adjoins up or down by performing operation of "tap" or "shake" to operation equipment 1 in the state where operation equipment 1 is inclined greater than or equal to T0 from the home position to direction (either of the Y-axis direction) to move cursor. In addition, it also becomes possible to move the cursor only one to the direction to which the operation "shake" is shaken by using the inclination angle at a moment to detect the operation. "shake."

In addition, although it is explained the example in which the indication key Km is arranged by Y-axis direction as like fourth key arrangement screen 36 in the embodiment, there is no restriction to arrangement direction of the indication key Km: for example, they can be arranged diagonal.

In addition, although it is comprised that the movement of cursor or execution of the operation is performed according to the inclination of operation equipment 1 when it is detected the operation of "tap" and "shake" performed to operation equipment 1 in the embodiment, it can be comprised that: if it is detected that the first predetermined operation of "tap" or "shake" performed to operation equipment 1, it moves the cursor; if it is detected that the second different predetermined operation of "shake" or "tap" from the first predetermined operation is performed to operation equipment 1, the operation assigned to the indication key Km, which is selected by the cursor, is performed. In this case, in fourth key arrangement screen 36, move order of the cursor is defined previously; cursor control part 15 moves the cursor in the move order previously set if it is detected the first predetermined operation is performed to operation equipment 1.

Then, it is explained in detail that the operation system, which is the other embodiment of the present invention, as refers to FIG. 25.

FIG. 25 is a block diagram showing the composition of the embodiment of the operation system according to the present invention.

Operation system 20, which is the other embodiment, as refer to FIG. 25, is comprised of body equipment 21, such as a DVD player, a television equipment or the like, and remote control equipment 22 which operates body equipment 21; body equipment 21 is equipped with display part 3, coordinates conversion part 8, operation detection part 9, screen memory part 10, cell information memory part 11, conversion table memory part 12, threshold information memory part 13, display control part 14, cursor control part 15, central control part 16 and receiving part 23; remote control equipment 22 is equipped with operation key 4, inclination angle detection part 6, AD conversion part 7 and transmitting part 24. In addition, it can be used a method to display, such as a display connected to body equipment 21 for display part 3 of body equipment 21.

Transmitting part 24 of remote control equipment 22 is modulates the posture signal and the press-down signal of operation key 4, which are outputted from inclination angle detection part 6 and converted into the digital signal by AD conversion part 7, to operation signals, such as infrared rays or the like, and transmits to the body equipment; the receiving part 23 of body equipment 21 restores to the operation signal received from remote control equipment 22, and the posture signal is inputted into coordinates conversion part 8, and the press-down signal of operation key 4 is inputted into cursor control part 15, respectively. Even if this assigns the composition of operation equipment 1 mentioned above to body equipment 21 and remote control equipment 22, almost similar operation as operation equipment 1 can be performed.

As explained above, according to the embodiment, it performs effects in that:

since the direction and angles of inclination of operation equipment 1 is directly associated with selection of indication key, either of the plurality of indication keys arranged on first key arrangement screen 31 and 32 can be directly selected according to the posture of the equipment, and the desired indication key can be selected in one operation of inclining the equipment because it is comprised that: the inclination of operation equipment 1 is detected by inclination angle detection part 6 and the posture signal is outputted; the rotation angle of the X-axis and the Y-axis which intersect perpendicularly in parallel with the main surface part mutually based on the posture signal by coordinates conversion part 8 is computed as the X-axis rotation angle and the Y-axis rotation angle, respectively; the cursor is moved by specifying either of the plurality of indication keys based on the X-axis rotation angle and the Y-axis rotation angle by cursor control part 15.

Furthermore, according to the embodiment, it performs effects in that:

since it can be just devised by preparing conversion tables for first key arrangement screen 31 and 32 where the arrangement of the indication key differs, respectively, when there are the plurality of first key arrangement screen 31 and 32 where the arrangement (number and arrangement) of the indication key differs; even if it changes the arrangement of the indication key arranged on first key arrangement screen 31 and 32, it can be devised easily because it is comprised that: while it is memorized the cell information, which is comprised of the plurality of cells, in cell information memory part 11, it is memorized the conversion table which correspond each cell with the indication key of the cell information in conversion table memory part 12; while it is specified one cell in the cell information as the current cell based on the X-axis rotation angle and the Y-axis rotation angle by cursor control part 15, it is specified the indication key corresponding with the current cell by using the conversion table, and the cursor is made to be moved.

Moreover, according to the embodiment, it performs effects in that:

since cursor to select musical piece 37 can be moved to desired direction only by inclining operation equipment 1 to desired direction to move the cursor to select musical piece 37, cursor to select musical piece 37 on musical piece map 40 can be moved to arbitrary direction according to the inclination of operation equipment 1; and the desired musical piece data can be selected by simple operation because when it is selected the musical piece data by cursor to select musical piece 37 showing the domain(s) on musical piece map 40 on which the plurality of musical piece data is unfolded, it is comprised of: detecting inclination of operation equipment 1 and outputting the posture signal by inclination angle detection part 6, moving cursor to select musical piece 37 to direction toward the operation equipment 1 inclined based on the posture signal, and selecting the musical piece data located in the cursor to select musical piece 37.

Moreover, according to the embodiment, it performs effects in that:

since cursor to select key 38 can be moved to direction of the indication key Km to select in the shortest distance only by inclining operation equipment 1 toward the direction to which the indication key Km to select is arranged, cursor to select key 38 on second key arrangement screen 34 can be moved to arbitrary direction according to the inclination of operation equipment 1, and the desired indication key Km can be quickly selected by simple operation because it is comprised that in the second key arrangement screen 34 arranged the plurality of indication keys Km assigned the different operation, when selecting either of the plurality of indication keys Km by cursor to select key 38, it detect the inclination of operation equipment 1 by the inclination angle detection part 6 and outputs the posture signal; it moves cursor to select key 38 to the direction which operation equipment 1 inclines based on the posture signal; it selects the indication key Km in which cursor to select key 38 is located.

Moreover, according to the embodiment, it performs effects in that:

since further movement is not performed unless it returns operation equipment 1 to the home position for the cursor which is already moved to the adjoining indication key Km, the cursor can be moved certainly to the adjoining indication key Km by inclining the operation equipment 1; it can make the cursor stop to the desired indication key Km certainly by performing operation which moves the cursor to the adjoining indication key Km two or more times even if having not get used to operation of inclining operation equipment 1 because when selecting either of the plurality of indication keys Km by the cursor in third key arrangement screen 35a and 35b arranged the plurality of indication keys Km assigned the different operation, it is comprised of detecting inclination of equipment by inclination angle detection part 6 and outputting the posture signal; extracting the inclination of arrangement direction of the indication key Km based on the posture signal by cursor control part 15; making the cursor moved one to the indication key Km which adjoins the extracted inclination direction if the extracted inclination changes from less than to greater than or equal to the first threshold previously set.

Furthermore, according to the embodiment, it performs effects in that:

the inclination of the cursor move direction can be determined easily because it is comprised that:

while computing the respective rotation angle of the X-axis and the Y-axis which are parallel to the main surface part and perpendicularly intersect mutually based on the posture signal by coordinates conversion part 8 as the X-axis rotation angle and the Y-axis rotation angle; and it is computed posture vector R which shows inclined direction by being composition of the computed X-axis rotation angle and Y-axis rotation angle; cursor control part 13 extracts the inclination of arrangement direction for the indication key Km from the computed posture vector R.

Furthermore, according to the embodiment, it performs effects in that:

the cursor can be moved to the indication key Km which adjoins different direction from arrangement direction of the indication key Km in one operation because it is comprised that: if the arrangement direction of the indication key Km is 2 direction as like third key arrangement screen 35b, cursor control part 15 extracts the inclination of 2 direction, which are the arrangement direction of the indication key Km, based on the posture signal, respectively; if both of the inclination of extracted 2 direction changes from less than the first threshold to more than that, the cursor can be moved one to the extracted 2 direction, respectively.

Moreover, according to the embodiment, it performs effects in that:

since the cursor can be moved certainly to the adjoining indication key Km which adjoins by performing predetermined operation to operation equipment 1, it can make the cursor stop to the desired indication key Km certainly by performing operation which moves the cursor to the adjoining indication key Km two or more times even if having not get used to operation of inclining operation equipment 1 because in fourth key arrangement screen 36 arranged the plurality of indication keys Km assigned the different operation, when selecting either of the plurality of indication keys Km by the cursor, it is comprised that: inclination of operation equipment 1 is detected by inclination angle detection part 6, and the posture signal is outputted; the predetermined operation to operation equipment 1 is detected by operation detection part 9 based on the posture signal; cursor control part 15 make the cursor move one to the indication key Km which adjoins the direction of operation equipment 1 inclined if the predetermined operation is detected by operation detection part 9.

Furthermore, according to the embodiment, it performs effects in that:

it can be performed alternatively that the certain movement of the cursor to the adjoining indication key Km or the execution of the operation assigned to the indication key Km by performing the predetermined operation to operation equipment 1, and it can be reduced the physical input key prepared in operation equipment 1 because it composes that: while cursor control part 15 extracts the inclination of arrangement direction of the indication key Km based on the posture signal, it compares the inclination in arrangement direction of the indication key Km before performing the predetermined operation to operation equipment 1 with the threshold previously set if the predetermined operation is detected, the cursor is moved one to the indication key Km which adjoins the extracted inclination direction if the inclination is greater than or equal to the threshold; central control part 16 performs the operation assigned to the indication key Km in which cursor is located if the inclination is less than the threshold.

As described above, according to the embodiment, it performs effects in that:

in first key arrangement screen 31 and 32 which the number of the indication keys Km is relatively few, it is able to select directly either of the plurality of indication keys Km arranged by the first cursor move control according to the posture of operation equipment 1; in second operation screen on which the number and the layout of the indication key Km differ from each other as first key arrangement screen 31 and 32, it is adopted that move control of the cursor suitable for the second operation screen by the second cursor move control which makes the cursor move in different logic from the first cursor move control; the operational capacity of the cursor movement in each operation screen based on the inclination angle of operation equipment 1 can be raised because it composes that: it detects the inclination of operation equipment 1 and outputs the posture signal by inclination angle detection part 6; either of the cursor control, which are the first cursor move control specifying either of the plurality of indication keys Km based on the posture signal and moving the cursor according to the operation screen or the second cursor move control moving the cursor in different logic from the first cursor move control based on the posture signal, is used properly.

Furthermore, according to the embodiment, it performs effects in that:

since the first cursor move control which can select directly either of the plurality of indication keys Km arranged on the operation screen according to the posture of operation equipment 1 or the second cursor move control which can make it move to arbitrary direction according to the inclination of operation equipment 1 can be properly used according to the operation screen, it can adopt proper move control of the cursor suitable for each the operation screen, and the operational capacity of the cursor movement can be raised in each operation screen based the inclination angle of operation equipment 1 because it is comprised that: it detects inclination of operation equipment 1 by inclination angle detection part 6 and outputs the posture signal; cursor control part 15, according to the operation screen, uses properly either of the first cursor move control which moves the cursor by specifying either of the plurality of indication keys Km based on the posture signal or the second cursor move control which moves the cursor to direction which operation equipment 1 inclines based on the posture signal and selects the indication key Km in which cursor is located.

Furthermore, according to the embodiment, it performs effects in that:

while being able to select directly either of the plurality of the arranged indication keys Km according to the posture of operation equipment 1 in the operation screen (first key arrangement screen 31 and 32), since the cursor to select musical piece 37 can be moved to arbitrary direction according to the inclination of operation equipment 1 in the screen of musical piece map 33, it can adopt the move control of the cursor suitable for each screen, and the operational capacity of the cursor movement in each screen based on the inclination angle of operation equipment 1 can be raised because it comprises that: it detects inclination of operation equipment 1 by inclination angle detection part 6 and outputs the posture signal; cursor control part 15 specifies either of the plurality of indication keys Km based on the posture signal and moves the cursor in the operation screen (first key arrangement screen 31 and 32) arranged the plurality of indication keys Km assigned the different operation, and it moves cursor to select musical piece 37 to direction which operation equipment 1 inclines based on the posture signal and makes to be selected the musical piece data located in cursor to musical piece 37 in the screen of musical piece map 33 which is arranged musical piece map 40 on which the plurality of musical piece data are unfolded.

Moreover, according to the embodiment, it performs effects in that:

while it can move the cursor in the shortest distance to direction of the indication key Km to select by the first cursor move control in second key arrangement screen 34, which has relatively many indication keys Km, it can be adopt the move control of the cursor suitable for the second operation screen by second cursor move control, which make the cursor move by different logic from first cursor move control in the second operation screen on which the number and the layout of indication key Km differ from each other for second key arrangement screen 34, and the operational capacity of cursor movement in each operation screen based on the inclination angle of operation equipment 1 can be raised because it composes that it use properly either of the first cursor move control of: detecting inclination of operation equipment 1 by the inclination angle detection part 6 and outputting the posture signal; making move the cursor to the direction which operation equipment 1 inclines based on the posture signal according to an operation screen; selecting indication key Km in which cursor is located, or the second cursor move control which moves the cursor in different logic from the first cursor move control based on the posture signal.

Furthermore, according to the embodiment, it performs effects in that:

it can be adopted the second cursor move control which can move cursor certainly to the adjoining indication key Km by making operation equipment 1 incline if the second operation screen is third key arrangement screen 35*a* by which the plurality of indication keys Km are arranged by one sequence because it composes that: as the second cursor move control, it extracts the inclination of arrangement direction of the indication key Km based on the posture signal; if the extracted inclination is changed from less than to the more than the first threshold previously set, it make the cursor moves one to the indication key Km which adjoins the extracted inclination direction.

Furthermore, according to the embodiment, it performs effects in that:

if the second operation screen is the fourth key arrangement screen 36 where the plurality of indication keys Km are arranged by one sequence, it can be adopted the second cursor move control which can move cursor certainly to the adjoining indication key Km by performing predetermined operation because it comprises that: it detects predetermined operation to operation equipment 1 by operation detection part 9; if the predetermined operation is detected by the operation detection part 9 as the second cursor move control, it makes the cursor move one to the indication key Km which adjoins direction to which operation equipment 1 inclines.

In addition, it is obvious that the present invention is not limited to the each embodiment described above, but the each embodiment is suitably changed without departing from the spirit and scope of the present invention. Moreover, number of composing members, a position, form or the like are not limited to the form of the implementation, and they can be made into a suitable number, a position, form or the like when working the present invention. In addition, the same mark is given to the same composing element in each figure.

What is claimed is:

1. An operation equipment that operates by selecting either of a plurality of indication keys by a cursor with using an operation screen arranged the plurality of indication keys assigned different operations, the operation equipment comprises:
    an inclination angle detector that detects inclination of an equipment and outputs an posture signal;
    a cursor controller that makes the cursor move by specifying either of the plurality of indication keys based on the posture signal from the inclination angle detector;
    a rotation angle calculator that computes rotation angles of an X-axis and a Y-axis which are parallel to a main surface part and perpendicularly intersect mutually based on the posture signal from the inclination angle detector as an X-axis rotation angle and a Y-axis rotation angle, respectively;
    a cell information memory that memorizes a cell information provided with a plurality of cells; and
    a conversion table memory that memorizes a conversion table that associates each cell of the cell information memorized by the cell information memory with the indication key; is provided, wherein
    the cursor controller specifies either of the plurality of indication keys based on the X-axis rotation angle and the Y-axis rotation angle that are computed by the rotation angle calculator and makes the cursor move; and
    the cursor controller specifies the indication key associated with the current cell by using the conversion table and moves the cursor while specifying one cell in the cell information as a current cell based on the X-axis rotation angle and the Y-axis rotation angle which are computed by the rotation angle calculator.

2. An operation equipment operates with selecting either of a plurality of indication keys by a cursor by using a key arrangement screen arranged the plurality of indication keys assigned to different operations, the operation equipment comprises:
    an inclination angle detector that detects an inclination of the equipment and outputs a posture signal; and
    a cursor controller that extracts an inclination of arrangement direction of the indication key based on the posture signal from the inclination angle detector and moves the cursor to one indication key in the direction toward the indication key which adjoins direction of an extracted inclination when the extracted inclination is changed from less than to greater than or equal to a first threshold previously set, wherein if arrangement directions of the indication key are two directions:
    extracting inclinations of the two directions which are the arrangement direction of the indication key based on the posture signal by the inclination angle detector, respectively; and
    moving the cursor to one indication key in the extracted two directions, respectively, if both of the extracted two directions are changed from less than to greater than or equal to a first threshold.

3. An operation equipment operates with selecting either of a plurality of indication keys by a cursor by using a key arrangement screen arranged the plurality of indication keys assigned to different operations, the operation equipment comprises:
    an inclination angle detector that detects an inclination of the equipment and outputs a posture signal; and
    a cursor controller that extracts an inclination of arrangement direction of the indication key based on the posture signal from the inclination angle detector and moves the cursor to one indication key in the direction toward the indication key which adjoins direction of an extracted inclination when the extracted inclination is changed from less than to greater than or equal to a first threshold previously set;
    a rotation angle calculator that computes a direction and how much inclined by being composition of an X-axis rotation angle and a Y-axis rotation angle, which respective rotation angles of an X-axis and a Y-axis which are parallel to a main surface part and perpendicularly intersect mutually is computed based on the posture signal from the inclination angle detector as the X-axis rotation angle and the Y-axis rotation angle, respectively; and
    the cursor controller extracts an inclination of an arrangement direction of the indication key from the posture vector computed by the rotation angle calculator, wherein if the arrangement directions of the indication key are two directions:
    extracting inclinations of the two directions which are the arrangement direction of the indication key based on the posture signal by the inclination angle detector, respectively; and
    moving the cursor to one indication key in an extracted two directions, respectively, if both of the extracted two directions are changed from less than to greater than or equal to the first threshold.

* * * * *